United States Patent
Sethia et al.

(10) Patent No.: US 11,871,104 B2
(45) Date of Patent: Jan. 9, 2024

(54) RECOMMENDATIONS FOR IMAGE CAPTURE

(71) Applicant: QUALCOMM Incorporated, San Diego, CA (US)

(72) Inventors: Sandeep Sethia, Bengaluru (IN); Ravichandra Ponaganti, Warangal Urban (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/707,810

(22) Filed: Mar. 29, 2022

(65) Prior Publication Data

US 2023/0319392 A1    Oct. 5, 2023

(51) Int. Cl.
*H04N 23/611* (2023.01)
*H04N 23/62* (2023.01)
*H04N 23/60* (2023.01)
*H04N 23/63* (2023.01)

(52) U.S. Cl.
CPC ........... *H04N 23/611* (2023.01); *H04N 23/62* (2023.01); *H04N 23/634* (2023.01); *H04N 23/64* (2023.01)

(58) Field of Classification Search
CPC .... H04N 23/611; H04N 23/62; H04N 23/634; H04N 23/64
See application file for complete search history.

(56) References Cited

U.S. PATENT DOCUMENTS

| | | | | |
|---|---|---|---|---|
| 9,526,127 | B1 * | 12/2016 | Taubman | G10L 15/22 |
| 10,630,896 | B1 * | 4/2020 | Liu | H04N 23/64 |
| 2004/0201741 | A1 * | 10/2004 | Ban | H04N 23/64 |
| | | | | 386/E5.072 |
| 2012/0262593 | A1 * | 10/2012 | Choi | H04N 23/611 |
| | | | | 348/E5.042 |
| 2015/0002633 | A1 * | 1/2015 | Hayashi | H04N 23/61 |
| | | | | 348/46 |
| 2015/0373258 | A1 * | 12/2015 | Chuang | G06V 10/7515 |
| | | | | 348/333.04 |

(Continued)

FOREIGN PATENT DOCUMENTS

| | | |
|---|---|---|
| CN | 110113523 A | 8/2019 |
| KR | 102228663 B1 | 3/2021 |

(Continued)

OTHER PUBLICATIONS

International Search Report and Written Opinion—PCT/US2023/064430—ISA/EPO—dated Jun. 5, 2023.

*Primary Examiner* — Timothy J Henn

(74) *Attorney, Agent, or Firm* — QUALCOMM Incorporated

(57) ABSTRACT

Systems, methods, and non-transitory media are provided for adjusting a posture of a subject being photographed. An example method can include obtaining, via a camera of a mobile device, an image depicting a subject posing in a first posture; determining a match between the first posture of the subject depicted in the image and a second posture from a set of stored user postures; and based on the match, generating a recommendation indicating one or more suggested adjustments to the first posture of the subject, the one or more suggested adjustments being estimated to increase a matching amount between the first posture of the subject and the second posture from the set of stored user postures.

36 Claims, 13 Drawing Sheets

(56) References Cited

U.S. PATENT DOCUMENTS

| | | | |
|---|---|---|---|
| 2017/0374280 A1* | 12/2017 | Chan | H04N 1/00183 |
| 2020/0084371 A1* | 3/2020 | Guo | H04N 23/63 |
| 2021/0335004 A1 | 10/2021 | Zohar et al. | |
| 2022/0232162 A1* | 7/2022 | Gupta | H04N 23/63 |

FOREIGN PATENT DOCUMENTS

| | | |
|---|---|---|
| WO | 2021023059 A1 | 2/2021 |
| WO | 2021135601 A1 | 7/2021 |
| WO | 2021179773 A1 | 9/2021 |

* cited by examiner

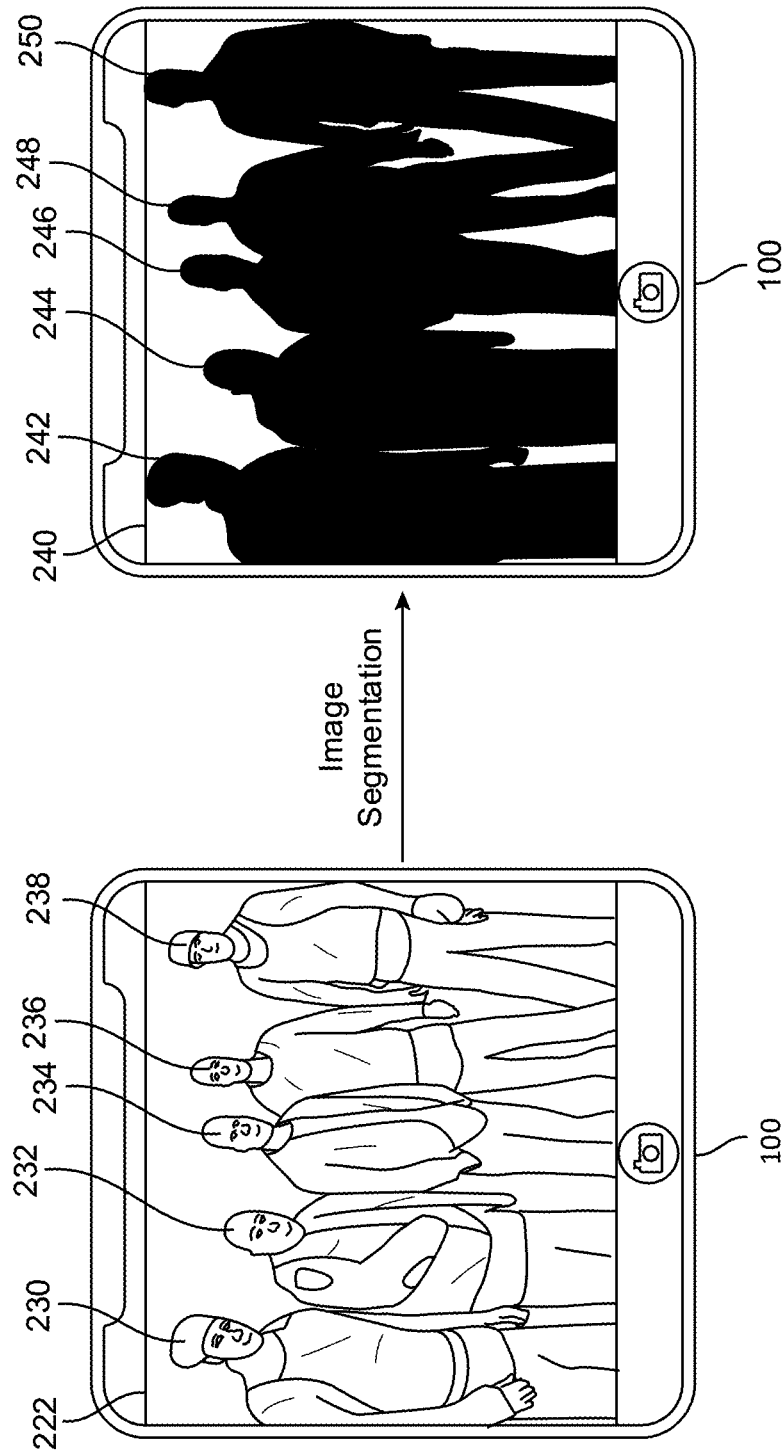

RECOMMENDATIONS FOR IMAGE CAPTURE

TECHNICAL FIELD

The present disclosure generally relates to image capture (e.g., capturing one or more photographs or videos). For example, aspects of the present disclosure relate to posture-based photograph recommendations and/or adjustments, such as adjusting a posture of a subject being photographed and recommending posture adjustments to the subject being photographed.

BACKGROUND

Electronic devices are increasingly equipped with camera hardware to capture images and/or videos for consumption. For example, a computing device can include a camera (e.g., a mobile device such as a mobile telephone or smartphone including one or more cameras) to allow the computing device to capture a video or image of a scene, a person, an object, etc. The image or video can be captured and processed by the computing device (e.g., a mobile device, an IP camera, extended reality device, connected device, etc.) and stored or output for consumption (e.g., displayed on the device and/or another device). In some cases, the image or video can be further processed for effects (e.g., compression, image enhancement, image restoration, scaling, framerate conversion, etc.) and/or certain applications such as computer vision, extended reality (e.g., augmented reality, virtual reality, and the like), object detection, image recognition (e.g., face recognition, object recognition, scene recognition, etc.), feature extraction, authentication, and automation, among others.

BRIEF SUMMARY

Systems and techniques are described herein for adjusting a posture (e.g., a pose, position, and/or other attribute) of a subject(s) being photographed and/or recommending adjustments to the posture of the subject(s) being photographed. According to at least one example, a method is provided for adjusting a posture of a subject(s) being photographed and/or recommending adjustments to the posture of the subject(s) being photographed. The method can include obtaining, via a camera of an electronic device, an image depicting a subject in a first posture; determining a matching amount between the first posture of the subject depicted in the image and a second posture from a set of stored user postures; and based on the matching amount, generating a recommendation indicating one or more suggested adjustments to the first posture of the subject, the one or more suggested adjustments being estimated to increase the matching amount between the first posture of the subject and the second posture from the set of stored user postures.

According to at least one example, a non-transitory computer-readable medium is provided for adjusting a posture of a subject(s) being photographed and/or recommending adjustments to the posture of the subject(s) being photographed. The non-transitory computer-readable medium can include instructions which, when executed by one or more processors, cause the one or more processors to obtain, via a camera of an electronic device, an image depicting a subject in a first posture; determine a matching amount between the first posture of the subject depicted in the image and a second posture from a set of stored user postures; and based on the matching amount, generate a recommendation indicating one or more suggested adjustments to the first posture of the subject, the one or more suggested adjustments being estimated to increase the matching amount between the first posture of the subject and the second posture from the set of stored user postures.

According to at least one example, an apparatus is provided for adjusting a posture of a subject(s) being photographed and/or recommending adjustments to the posture of the subject(s) being photographed. The apparatus can include a memory and one or more processors coupled to the memory, the one or more processors configured to obtain, via a camera of an electronic device, an image depicting a subject in a first posture; determine a matching amount between the first posture of the subject depicted in the image and a second posture from a set of stored user postures; and based on the matching amount, generate a recommendation indicating one or more suggested adjustments to the first posture of the subject, the one or more suggested adjustments being estimated to increase the matching amount between the first posture of the subject and the second posture from the set of stored user postures.

According to at least one example, another apparatus is provided for adjusting a posture of a subject(s) being photographed and/or recommending adjustments to the posture of the subject(s) being photographed. The apparatus can include means for obtaining, via a camera of an electronic device, an image depicting a subject in a first posture; determining a matching amount between the first posture of the subject depicted in the image and a second posture from a set of stored user postures; and based on the matching amount, generating a recommendation indicating one or more suggested adjustments to the first posture of the subject, the one or more suggested adjustments being estimated to increase the matching amount between the first posture of the subject and the second posture from the set of stored user postures.

In some aspects, the method, non-transitory computer-readable medium, and apparatuses described above can determine a respective matching amount between the first posture of the subject and each posture from the set of stored user postures; select the second posture from the set of stored user postures based on the respective matching amount between the first posture of the subject and each posture from the set of stored user postures, wherein the second posture comprises a highest matching posture from the set of stored user postures; and in response to selecting the second posture, generate the recommendation indicating the one or more suggested adjustments to the first posture of the subject.

In some examples, determining the matching amount between the first posture of the subject and the second posture from the set of stored user postures can include comparing the first posture of the subject with the second posture from the set of stored user postures. In some cases, determining the matching amount can include determining, based on the comparing of the first posture with the second posture, a matching score for the second posture.

In some examples, the matching amount indicates an amount of alignment between a first outline of the first posture of the subject and a second outline of the second posture, an amount of overlap between the first outline of the first posture of the subject and the second outline of the second posture, an amount of similarity between the first outline of the first posture of the subject and the second outline of the second posture, and/or a percent match between the first outline of the first posture of the subject and the second outline of the second posture.

In some aspects, the method, non-transitory computer-readable medium, and apparatuses described above can compare the first posture of the subject with each posture from the set of stored user postures; determine a respective matching amount between the first posture of the subject and each posture from the set of stored user postures; and determine, based on the respective matching amount between the first posture of the subject and each posture from the set of stored user postures, a number of highest matching postures from the set of stored user postures, wherein the number of highest matching postures comprises the second posture.

In some aspects, the method, non-transitory computer-readable medium, and apparatuses described above can generate an indication of the number of highest matching postures; receive a user input selecting the second posture from the number of highest matching postures; and select the second posture based on the user input.

In some aspects, the method, non-transitory computer-readable medium, and apparatuses described above can present, at a display of the electronic device, the indication of the number of highest matching postures or send, to one or more devices associated with the subject, the indication of the number of highest matching postures. In some cases, the indication of the number of highest matching postures can include a preview of the number of highest matching postures.

In some aspects, the method, non-transitory computer-readable medium, and apparatuses described above can in response to selecting the second posture based on the user input, generate the recommendation indicating the one or more suggested adjustments to the first posture of the subject.

In some cases, generating the recommendation indicating the one or more suggested adjustments to the first posture of the subject can include determining, based on a comparison between the first posture of the subject and the second posture from the set of stored user postures, one or more differences between the first posture of the subject and the second posture from the set of stored user postures; and determining the one or more suggested adjustments based on the one or more differences between the first posture of the subject and the second posture from the set of stored user postures.

In some aspects, the method, non-transitory computer-readable medium, and apparatuses described above can obtain, via the camera of the electronic device, a second image depicting the subject in a third posture; detect the third posture of the subject in the second image; and determine that the third posture of the subject at least partially includes the one or more suggested adjustments.

In some aspects, the method, non-transitory computer-readable medium, and apparatuses described above can in response to determining that the third posture of the subject includes the one or more suggested adjustments, send the second image depicting the subject in the third posture to one or more devices associated with the subject. In some aspects, the method, non-transitory computer-readable medium, and apparatuses described above can in response to determining that the third posture of the subject includes the one or more suggested adjustments, store the second image depicting the subject in the third posture.

In some aspects, the method, non-transitory computer-readable medium, and apparatuses described above can determine, based on a comparison between the third posture of the subject and the second posture from the set of stored user postures, one or more differences between the third posture of the subject and the second posture from the set of stored user postures; determine one or more additional adjustments based on the one or more differences between the third posture of the subject and the second posture from the set of stored user postures; and modify, using a machine learning model, the second image based on the one or more additional adjustments.

In some examples, modifying the second image based on the one or more additional adjustments can include performing at least one of a geometric transformation of at least a portion of the third posture in the second image associated with the one or more additional adjustments and a transformation of a set of pixel coordinates in the second image, the set of pixel coordinates corresponding to pixels depicting at least the portion of the third posture in the second image associated with the one or more additional adjustments.

In some aspects, the method, non-transitory computer-readable medium, and apparatuses described above can update the set of stored user postures to include a particular posture of the subject depicted in one or more images of the subject.

In some aspects, the method, non-transitory computer-readable medium, and apparatuses described above can determine that the subject is facing a display of the electronic device; and present, at the display of the electronic device, the recommendation indicating one or more suggested adjustments to the first posture of the subject, the recommendation being presented at the display while the subject is facing the display.

In some aspects, the method, non-transitory computer-readable medium, and apparatuses described above can present, at a first portion of a foldable display of the electronic device, the recommendation indicating one or more suggested adjustments to the first posture of the subject. In some examples, the first portion of the foldable display can include a display portion that is at least partly folded relative to a second portion of the foldable display.

In some aspects, the method, non-transitory computer-readable medium, and apparatuses described above can generate, based on the one or more suggested adjustments to the first posture of the subject, haptic feedback including vibrations indicative of at least one suggested adjustment from the one or more suggested adjustments.

In some aspects, the method, non-transitory computer-readable medium, and apparatuses described above can send the one or more suggested adjustments to a device associated with the subject. In some examples, the device can include a watch, a head-mounted display, a mobile phone, and/or glasses.

In some aspects, each of the apparatuses described above is, can be part of, or can include a mobile device, a smart or connected device, a camera system, and/or an extended reality (XR) device (e.g., a virtual reality (VR) device, an augmented reality (AR) device, or a mixed reality (MR) device). In some examples, the apparatuses can include or be part of a mobile device (e.g., a mobile telephone or so-called "smart phone" or other mobile device), a wearable device, a personal computer, a laptop computer, a tablet computer, a server computer, a robotics device or system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative examples of the present application are described in detail below with reference to the following figures:

FIG. 2B is a diagram illustrating an example preview image of a group of subjects being photographed by an electronic device and segmentation masks generated based on the preview image, in accordance with some examples of the present disclosure;

DETAILED DESCRIPTION

Figure 1:
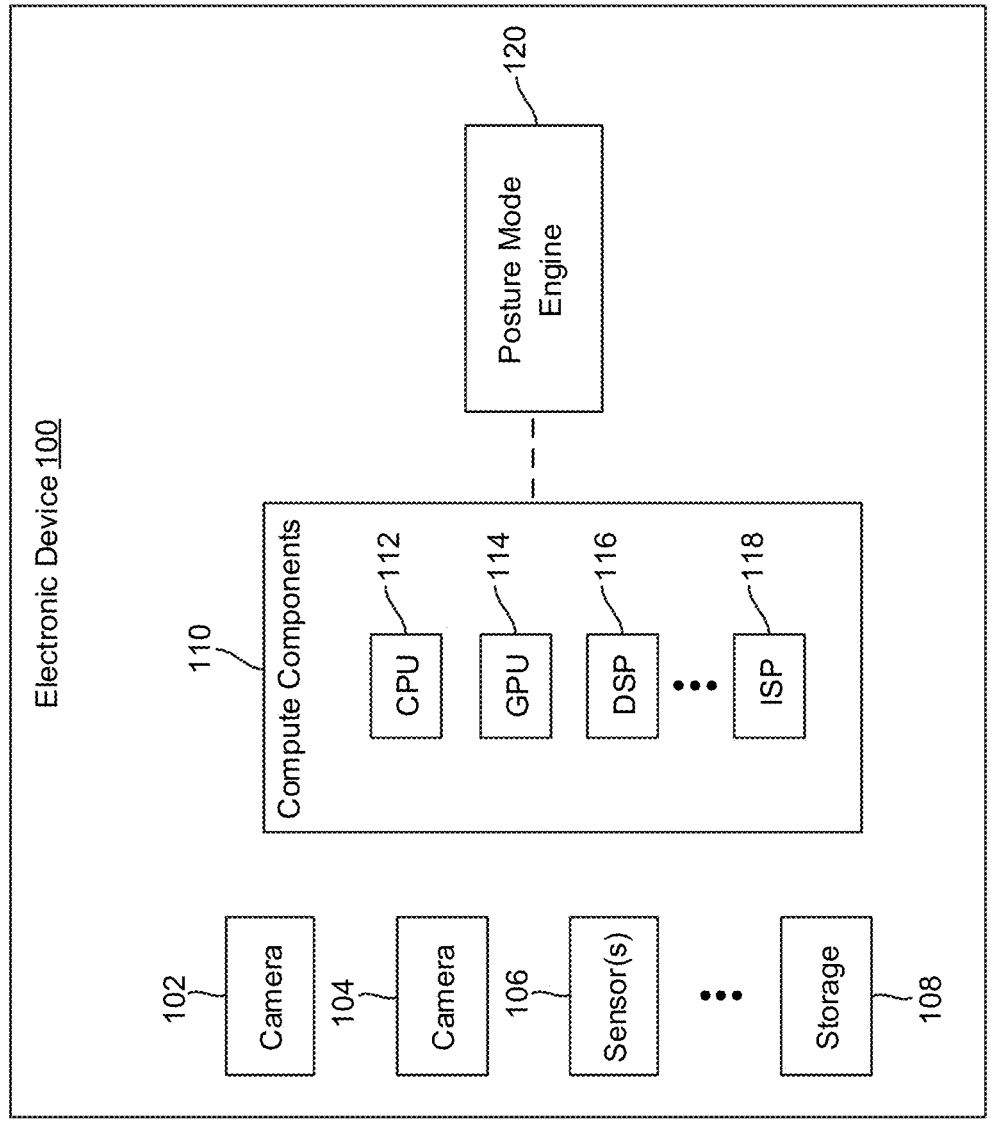
FIG. 1 is a diagram illustrating an example of an electronic device used to adjust user posture settings in photographs and/or provide feedback and recommendations for adjusting postures of subjects being photographed, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Electronic devices (e.g., mobile phones, wearable devices (e.g., smart watches, smart glasses, etc.), tablet computers, extended reality (XR) devices (e.g., virtual reality (VR) devices, augmented reality (AR) devices, mixed reality (MR) devices, and the like), connected devices, laptop computers, etc.) can implement cameras to capture images or video frames of a scene, a person(s), an animal(s), and/or any object(s). A camera can refer to a device that receives light and captures image frames, such as still images or video frames, using an image sensor. The terms "image," "image frame," and "frame" are used interchangeably herein. A camera system can include processors (e.g., an image signal processor (ISP), etc.) that can receive one or more images and process the one or more images. For example, a raw image captured by a camera sensor can be processed by an ISP to generate a final image. Processing by the ISP can be performed by filters or processing blocks applied to the captured image, such as denoising or noise filtering, edge enhancement, color balancing, contrast, intensity adjustment (such as darkening or lightening), tone adjustment, among others. Image processing blocks or modules may include lens/sensor noise correction, Bayer filters, de-mosaicing, color conversion, correction or enhancement/suppression of image attributes, denoising filters, sharpening filters, among others.

Users often use electronic devices equipped with a camera(s) to capture images of themselves or to capture group photos depicting a group of people. In many cases, a user (or group of users) like to pose in certain positions and/or angles when taking an image of themselves in a desired pose. However, when users (or groups of users) take a photograph of themselves, the photographs often do not depict the users in their desired pose. In some examples, this can happen because the person taking the photograph is not proficient or experienced with taking photographs and/or because the photograph was captured while the user(s) being photographed is not in a desired pose. In many cases, the user may take multiple photographs to obtain a photograph that depicts the user(s) in a desired pose.

Moreover, when taking a group photograph, some (or all) of the people in the group photograph may appear in different or inconsistent postures. Because of the different or inconsistent postures of the people in the photograph, the generated photograph may not appear as desired by some or all of the people in the photograph. As a result, the group may take multiple photographs together until they capture a photograph depicting the group of people (and/or each person in the group) in a desired posture and/or until they capture a photograph of their liking. This can be time-consuming and can lead to a number of unnecessary photographs being captured. It can also be difficult to obtain a photograph depicting the group of people (and/or each person in the group) in the desired posture. In many cases, the group of people may not be able to obtain a photograph depicting the group in a desired pose or set of poses.

Systems, apparatuses, methods (also referred to as processes), and computer-readable media (collectively referred to herein as "systems and techniques") are described herein for adjusting a posture of a subject(s) being photographed and/or recommending adjustments to the posture of the subject(s) being photographed. As used here, posture can refer to a pose, a position, and/or other attribute of a user. In some examples, a camera device of an electronic device (e.g., an XR device, a mobile device, a tablet computer, a camera system, a connected device, a laptop computer, a smart wearable device, etc.) can implement a posture mode to adjust a posture of a subject(s) being photographed using the camera device and/or provide feedback to the subject(s) on how to adjust the posture of the subject(s) to match a particular posture from a set of user postures stored on the electronic device. In some aspects, the electronic device can perform face detection on a preview image of the subject(s) and automatically enable posture mode on the camera device of the electronic device (or generate a recommendation to enable posture mode on the camera device) when it detects one or more faces in the preview image.

The set of user postures can include previous postures of the subject(s) depicted in previous photographs of the subject(s), professional postures (e.g., postures of subjects from photographs taken by one or more professional photographers, postures of subjects in professional photographs, postures of a particular subject from professional photographs, postures from a template of postures, etc.), a set of stick figures in particular postures (e.g., stick figures depicting particular postures), and/or any other set of user postures. The electronic device can store the set of user postures for use by the portrait mode as described herein. In some examples, the electronic device can store each posture selected by the subject(s) when taking a photograph and/or each posture of the subject(s) depicted in photographs taken of/by the subject(s).

In some cases, the electronic device can compare a posture of a subject in a preview image captured by the camera device of the electronic device with the set of user postures in storage. Based on the comparison, the electronic device can identify a posture from the set of user postures having a highest match to the posture of the subject in the preview image. The electronic device can then adjust the posture of the subject to match (or substantially match) the identified posture from the set of user postures and/or provide recommendations to the subject for adjusting the subject's posture to match (or substantially match) the identified posture from the set of user postures. In other examples, the electronic device can identify, based on the comparison, the top n number of highest matching postures from the set of user postures. For example, the electronic device can compare the posture of the subject in the preview image with the set of user postures and determine a score for each of the set of user postures. Each score can reflect a matching amount between a respective posture from the set of user postures and the posture of the subject in the preview image. The electronic device can select postures from the set of user postures having the highest n number of scores. The electronic device can allow the subject to select one of the postures, and use the selected posture to adjust the posture of the subject to match (or substantially match) the selected posture and/or provide recommendations to the subject for adjusting the subject's posture to match (or substantially match) the selected posture.

In some cases, the electronic device can present the set of user postures to the subject and allow the subject to select a particular posture from the set of user postures. The electronic device can compare the particular posture selected by the subject to a posture of the subject depicted in a preview image captured by the camera device of the electronic device. The electronic device can use the difference between the particular posture selected by the subject and the posture of the subject depicted in the preview image to adjust the posture of the subject to match (or substantially match) the particular posture selected by the subject and/or provide recommendations to the subject for adjusting the subject's posture to match (or substantially match) the particular posture selected by the subject. For example, the electronic device can allow the subject to select a particular posture from the set of user postures. The electronic device can determine any differences between the particular posture and a posture of the subject in a preview image of the subject captured by the camera device of the electronic device, and use the determined differences between the particular posture and the posture of the subject in the preview image of the subject to provide recommendations to the subject for adjusting the subject's posture to match (or substantially match) the particular posture and/or guide the subject in achieving a posture matching (or substantially matching) the particular posture.

In some cases, the electronic device can perform image segmentation to generate a segmentation mask corresponding to the shape and posture of the subject as depicted in a preview image of the subject captured by the camera device of the electronic device. The electronic device can compare the segmentation mask with the set of user postures (e.g., user posture representations or stick figures depicted in particular postures) to determine a matching amount between the posture of the subject depicted in the preview image of the subject and one or more postures in the set of user postures. In some examples, the electronic device can recommend posture adjustments to the subject based on the highest matching posture in the set of user postures. In some examples, the electronic device can provide to the subject feedback for adjusting the subject's posture to match (or substantially match) the highest matching posture from the set of user postures. In some cases, the electronic device can provide the feedback for posture adjustments based on a difference between the posture of the subject depicted in the preview image and the highest matching posture from the set of user postures. The electronic device can provide the feedback to the subject by displaying posture adjustment recommendations or sending (e.g., via wired or wireless communications) the feedback to another device, such as a mobile device of the subject. In some cases, the electronic device can provide the feedback to the subject along with a depiction of the highest matching posture from the set of user postures.

In some aspects, the electronic device can perform auto-posture correction to adjust a posture of a subject depicted in a preview frame according to a selected posture from the set of user postures. For example, the electronic device can perform image segmentation to determine a posture of a subject in a preview image. The electronic device can compare the posture of the subject to a selected posture from the set of user postures. The electronic device can then adjust the posture of the subject to better match the selected posture from the set of user postures. In some examples, the electronic device can implement a machine learning algorithm to automatically align the posture of the subject to an outline (e.g., a bounding shape such as a bounding box) of the selected posture from the set of user postures. In some cases, the electronic device can implement an algorithm/model such as, for example and without limitation, a PoseNet pose estimation model, a scale-invariant feature transform (SIFT) algorithm, a pose detection algorithm, a speeded up robust features (SURF) algorithm, an Oriented FAST and rotated BRIEF (ORB) algorithm, and/or any pose detection algorithm/model or combination of pose detection algorithms/models.

Various aspects of the application will be described with respect to the figures.

FIG. 1 is a diagram illustrating an example of an electronic device 100 used to adjust user posture settings in photographs and/or provide feedback/recommendations for adjusting postures of subjects being photographed, as further described herein. In some examples, the electronic device 100 can include an electronic device configured to implement a posture mode as described herein. In some aspects, the electronic device 100 can be configured to provide one or more functionalities such as, for example, imaging functionalities, image data segmentation functionalities, detection functionalities (e.g., object detection, pose detection, face detection, shape detection, scene detection, etc.), image processing functionalities, extended reality (XR) functionalities (e.g., localization/tracking, detection, classification, mapping, content rendering, etc.), device management and/or control functionalities, gaming functionalities, computer vision, robotic functions, automation, and/or any other computing functionalities.

In the illustrative example shown in FIG. 1, the electronic device 100 can include one or more camera devices, such as camera 102 and camera 104, one or more sensors 106 (e.g., an ultrasonic sensor, an inertial measurement unit, a depth sensor using any suitable technology for determining depth (e.g., based on time-of-flight (ToF), structured light, or other depth sensing technique or system), a touch sensor, a microphone, etc.), a storage 108, and one or more compute components 110. In some cases, the electronic device 100 can optionally include one or more other/additional sensors such as, for example and without limitation, a pressure sensor (e.g., a barometric air pressure sensor and/or any other pressure sensor), a gyroscope, an accelerometer, a magnetometer, and/or any other sensor. In some examples, the electronic device 100 can include additional components such as, for example, a light-emitting diode (LED) device, a cache, a communications interface, a display, a memory device, etc. An example architecture and example hardware components that can be implemented by the electronic device 100 are further described below with respect to FIG. 12.

The electronic device 100 can be part of, or implemented by, a single computing device or multiple computing devices. In some examples, the electronic device 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a smart television, a display device, a gaming console, an XR device such as an HMD, an IoT (Internet-of-Things) device, a smart wearable device, or any other suitable electronic device(s).

In some implementations, the camera 102, the camera 104, the one or more sensors 106, the storage 108, and/or the one or more compute components 110 can be part of the same computing device. For example, in some cases, the camera 102, the camera 104, the one or more sensors 106, the storage 108, and/or the one or more compute components 110 can be integrated with or into a camera system, a smartphone, a laptop, a tablet computer, a smart wearable device, an XR device such as an HMD, an IoT device, a gaming system, and/or any other computing device. In other implementations, the camera 102, the camera 104, the one or more sensors 106, the storage 108, and/or the one or more compute components 110 can be part of, or implemented by, two or more separate computing devices.

The one or more compute components 110 of the electronic device 100 can include, for example and without limitation, a central processing unit (CPU) 112, a graphics processing unit (GPU) 114, a digital signal processor (DSP) 116, and/or an image signal processor (ISP) 118. In some examples, the electronic device 100 can include other processors or processing devices such as, for example, a computer vision (CV) processor, a neural network processor (NNP), an application-specific integrated circuit (ASIC), a field-programmable gate array (FPGA), etc. The electronic device 100 can use the one or more compute components 110 to perform various computing operations such as, for example, posture mode functionalities as described herein, extended reality operations (e.g., tracking, localization, object detection, classification, pose estimation, mapping, content anchoring, content rendering, etc.), detection (e.g., face detection, object detection, scene detection, human detection, etc.), image segmentation, automatic posture correction, device control operations, image/video processing, graphics rendering, machine learning, data processing, modeling, calculations, computer vision, and/or any other operations.

In some cases, the one or more compute components 110 can include other electronic circuits or hardware, computer software, firmware, or any combination thereof, to perform any of the various operations described herein. In some examples, the one or more compute components 110 can include more or less compute components than those shown in FIG. 1. Moreover, the CPU 112, the GPU 114, the DSP 116, and the ISP 118 are merely illustrative examples of compute components provided for explanation purposes.

The camera 102 and/or the camera 104 can include any image and/or video sensor and/or image/video capture device, such as a digital camera sensor, a video camera sensor, a smartphone camera sensor, an image/video capture device on an electronic apparatus such as a television or computer, a camera, etc. In some cases, the camera 102 and/or the camera 104 can be part of a camera system or computing device such as a digital camera, a video camera, an IP camera, a smartphone, a smart television, a game system, etc. Moreover, in some cases, the camera 102 and the camera 104 can include multiple image sensors, such as rear and front sensor devices, and can be part of a dual-camera or other multi-camera assembly (e.g., including two camera, three cameras, four cameras, or other number of cameras). In some examples, the camera 102 and/or the camera 104 can be part of a camera. The camera can be configured to implement a posture mode as further described herein.

In some examples, the camera 102 and the camera 104 can capture image data and generate frames based on the image data and/or provide the image data or frames to the one or more compute components 110 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

The storage 108 can include any storage device(s) for storing data such as, for example and without limitation, image data, posture date, scene data, user data, preferences, etc. The storage 108 can store data from any of the components of the electronic device 100. For example, the storage 108 can store data or measurements from any of the cameras 102 and 104, the one or more sensors 106, the compute components 110 (e.g., processing parameters, outputs, video, images, segmentation maps/masks, depth maps, filtering results, calculation results, detection results, posture correction data, etc.), the posture mode engine 120, and/or any other components. In some examples, the storage 108 can include a buffer for storing data (e.g., image data, posture data, etc.) for processing by the compute components 110.

The one or more compute components 110 can perform image/video processing, posture mode functionalities as described herein, automatic posture correction as described herein, machine learning, XR processing, device management/control, detection (e.g., object detection, face detection, scene detection, human detection, etc.) and/or other operations as described herein using data from the camera 102, the camera 104, the one or more sensors 106, the storage 108, and/or any other sensors and/or components. In some examples, the one or more compute components 110 can implement one or more software engines and/or algorithms such as, for example, a posture mode engine 120 or algorithm as described herein. In some cases, the one or more compute components 110 can implement one or more other or additional components and/or algorithms such as a machine learning model(s), a computer vision algorithm(s), a neural network(s), and/or any other algorithm and/or component.

The posture mode engine 120 can implement one or more algorithms and/or machine learning models configured to implement a posture mode and/or any of the posture mode operations described herein. In some examples, the posture mode engine 120 can be configured to adjust a posture of a subject(s) being photographed by the electronic device 100 (e.g., via camera 102 or camera 104) and/or recommend adjustments to the posture of the subject(s) being photographed. In some examples, the posture mode engine 120 can be configured to generate and/or provide feedback to the subject(s) on how to adjust a posture of the subject(s) to match a particular posture from a set of user postures stored on the storage 108. In some aspects, the posture mode engine 120 can perform face detection on a preview image of the subject(s) and automatically enable posture mode on the camera 102 and/or the camera 104 (or generate a recommendation to enable posture mode on the camera 102 and/or camera 104) when it detects one or more faces in the preview image.

The set of user postures can include previous postures of the subject(s) depicted in previous photographs of the subject(s), professional postures (e.g., postures of subjects from photographs taken by one or more professional photographers, postures of subjects in professional photographs, postures of a particular subject from professional photographs, postures from a template of postures, etc.), a set of stick figures in particular postures (e.g., stick figures depicting particular postures), postures from images in a photo gallery in the electronic device 100, postures from images in a photo gallery of another device, postures from images in a photo sharing and/or storage service (e.g., a cloud-based photo sharing and/or storage service, etc.), and/or any other set of user postures.

In some cases, the posture mode engine 120 can convert a photograph (e.g., from a photo gallery of the electronic device 100, a photo gallery of another device, a photograph from photo sharing and/or storage service, etc.) into a stick figure (e.g., a posture stick figure) depicting the selected posture, and store the stick figure as part of the set of user postures. The posture mode engine 120 can store the set of user postures on the storage 108 for use by the portrait mode as described herein. In some examples, the posture mode engine 120 can store on the storage 108 each posture selected by the subject(s) when taking a photograph and/or each posture of the subject(s) depicted in photographs taken of/by the subject(s).

In some examples, the posture mode engine 120 can learn (e.g., using a machine learning model or any learning algorithm) posture preferences of one or more users. For example, as a user takes a photograph in a particular posture or accepts a recommended posture for a photograph, the posture mode engine 120 can add the particular and/or recommended posture to the set of user postures. In some examples, the posture mode engine 120 can identify one or more characteristics of each posture used by a user and/or accepted by the user, and use the one or more characteristics to help identify postures of interest for future photographs and/or recommend adjustments to postures in photographs being taken.

In some cases, the posture mode engine 120 can compare a posture of a subject in a preview image captured by the electronic device 100 (e.g., via camera 102 or camera 104) with the set of user postures in the storage 108. Based on the comparison, the posture mode engine 120 can identify a posture from the set of user postures having a highest match to the posture of the subject in the preview image. The posture mode engine 120 can then adjust the posture of the subject to match (or substantially match) the identified posture from the set of user postures and/or provide recommendations to the subject for adjusting the subject's posture to match (or substantially match) the identified posture from the set of user postures. In other examples, the posture mode engine 120 can identify, based on the comparison, the top n number of highest matching postures from the set of user postures. For example, the posture mode engine 120 can compare the posture of the subject in the preview image with the set of user postures and determine a score for each of the set of user postures. Each score can reflect a matching amount between a respective posture from the set of user postures and the posture of the subject in the preview image. The posture mode engine 120 can select postures from the set of user postures having the highest n number of scores. In some cases, the posture mode engine 120 can allow the subject to select one of the postures, and use the selected posture to adjust the posture of the subject to match (or substantially match) the selected posture and/or provide recommendations to the subject for adjusting the subject's posture to match (or substantially match) the selected posture.

In some cases, the posture mode engine 120 can present (e.g., on a display device of the electronic device 100 and/or a display device of a separate electronic device) the set of user postures to the subject and allow the subject to select a particular posture from the set of user postures. The particular posture selected by the subject can represent a posture that the subject wishes to match in a photograph of the subject. The posture mode engine 120 can compare the particular posture selected by the subject to a posture of the subject depicted in a preview image captured by the electronic device 100. The posture mode engine 120 can use the difference between the particular posture selected by the subject and the posture of the subject depicted in the preview image to adjust the posture of the subject to match (or substantially match) the particular posture selected by the subject and/or provide recommendations to the subject for adjusting the subject's posture to match (or substantially match) the particular posture selected by the subject. For example, the posture mode engine 120 can allow the subject to select a particular posture from the set of user postures. The posture mode engine 120 can determine any differences between the particular posture and a posture of the subject in a preview image of the subject captured by the electronic device 100, and use the determined differences between the particular posture and the posture of the subject in the preview image of the subject to provide recommendations to the subject for adjusting the subject's posture to match (or substantially match) the particular posture and/or guide the subject in achieving a posture matching (or substantially matching) the particular posture.

In some cases, the posture mode engine 120 can perform image segmentation to generate a segmentation mask corresponding to the shape and posture of the subject as depicted in a preview image of the subject captured by the electronic device 100. The posture mode engine 120 can compare the segmentation mask with the set of user postures (e.g., user posture representations or stick figures depicted in particular postures) to determine a matching amount between the posture of the subject depicted in the preview image of the subject and one or more postures in the set of user postures. In some examples, the posture mode engine 120 can recommend posture adjustments to the subject based on the highest matching posture in the set of user postures. In some examples, the posture mode engine 120 can provide to the subject feedback for adjusting the subject's posture to match (or substantially match) the highest matching posture from the set of user postures.

In some cases, the posture mode engine 120 can provide the feedback for posture adjustments based on a difference between the posture of the subject depicted in the preview image and the highest matching posture from the set of user postures. The posture mode engine 120 can provide the feedback to the subject by displaying (e.g., via a display device of the electronic device 100) posture adjustment recommendations or sending (e.g., via wired or wireless communications) the feedback to another device, such as a mobile device of the subject. In some cases, the posture mode engine 120 can provide the feedback to the subject along with a depiction of the highest matching posture from the set of user postures.

In some aspects, the posture mode engine 120 can perform auto-posture correction to adjust a posture of a subject depicted in an image or a preview image according to a selected posture from the set of user postures. For example, the posture mode engine 120 can perform image segmentation to determine a posture of a subject in an image or a preview image. The posture mode engine 120 can compare the posture of the subject to a selected posture from the set of user postures. The posture mode engine 120 can then adjust the posture of the subject to better match the selected posture from the set of user postures. In some examples, the posture mode engine 120 can implement a machine learning algorithm to automatically align the posture of the subject to an outline (e.g., a bounding shape such as a bounding box) of the selected posture from the set of user postures. In some cases, the posture mode engine 120 can implement an algorithm/model such as, for example and without limitation, a PoseNet pose estimation model, a scale-invariant feature transform (SIFT) algorithm, a pose detection algorithm, a speeded up robust features (SURF) algorithm, an Oriented FAST and rotated BRIEF (ORB) algorithm, a neural network configured to perform one or more operations as described herein, and/or any pose detection algorithm/model or combination of pose detection algorithms/models.

In some cases, the one or more sensors 106 can detect an acceleration, angular rate, and/or orientation of the electronic device 100 and generate measurements based on the detected acceleration. In some cases, the one or more sensors 106 can detect and measure the orientation, linear velocity, and/or angular rate of the electronic device 100. For example, the one or more sensors 106 can measure a movement and/or a pitch, roll, and yaw of the electronic device 100. In some examples, the electronic device 100 can use measurements obtained by the one or more sensors 106 and/or data from one or more of the camera 102 and/or the camera 104, to calculate a pose of the electronic device 100 within three-dimensional (3D) space. In some cases, the electronic device 100 can additionally or alternatively use sensor data from the camera 102, the camera 104, the one or more sensors 106, and/or any other sensor to perform tracking, pose estimation, mapping, image segmentation, face detection, human detection, scene detection, object detection, image data pre-processing and/or post-processing, and/or other operations as described herein.

The components shown in FIG. 1 with respect to the electronic device 100 are illustrative examples provided for explanation purposes. In other examples, the electronic device 100 can include more or less components than those shown in FIG. 1. While the electronic device 100 is shown to include certain components, one of ordinary skill will appreciate that the electronic device 100 can include more or fewer components than those shown in FIG. 1. For example, the electronic device 100 can include, in some instances, one or more memory devices (e.g., RAM, ROM, cache, and/or the like), one or more networking interfaces (e.g., wired and/or wireless communications interfaces and the like), one or more display devices, caches, storage devices, and/or other hardware or processing devices that are not shown in FIG. 1. An illustrative example of a computing device and/or hardware components that can be implemented with the electronic device 100 are described below with respect to FIG. 12.

Figure 2A:
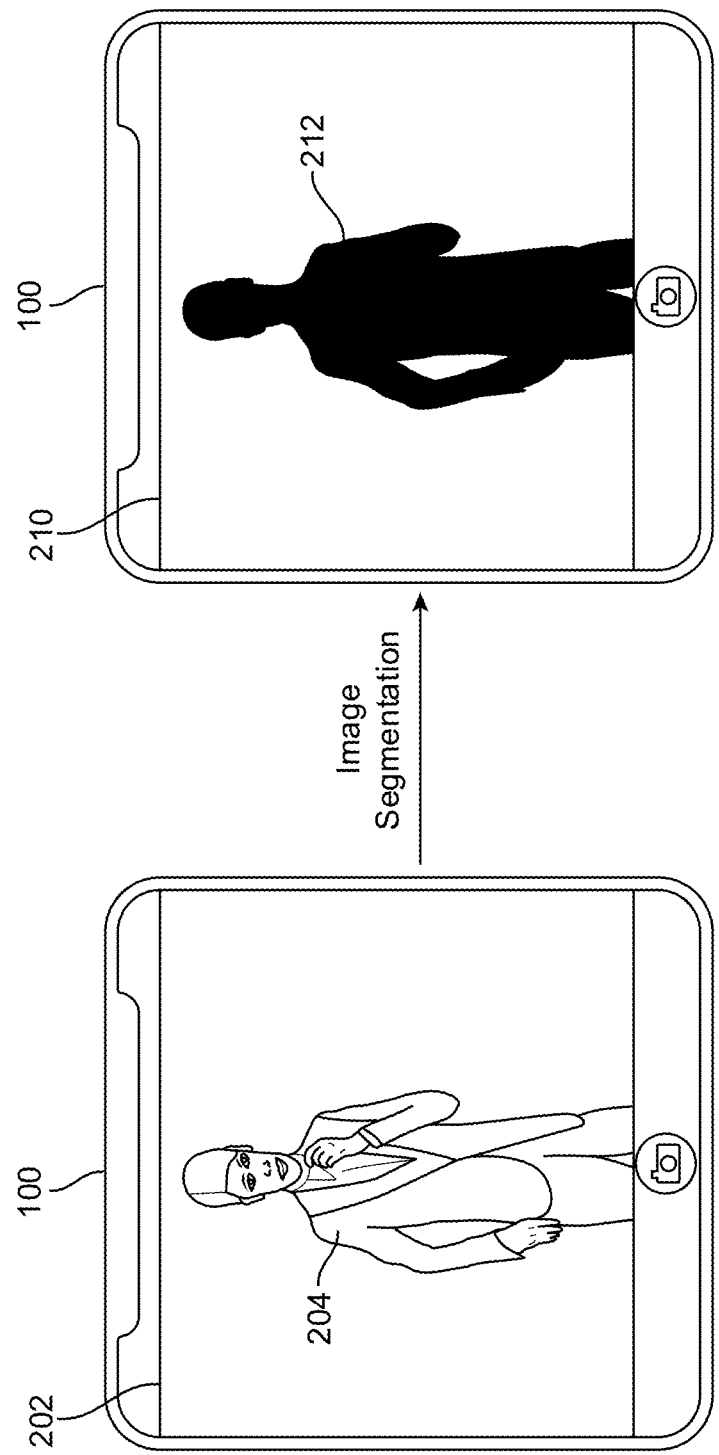
FIG. 2A is a diagram illustrating an example preview image of a subject being photographed by an electronic device and a segmentation mask generated based on the preview image, in accordance with some examples of the present disclosure.

FIG. 2A is a diagram illustrating an example preview image 202 of a subject 204 being photographed by the electronic device 100 and a segmentation mask 212 generated based on the preview image 202. The preview image 202 shows the subject 204 posing for the photograph in a particular posture. The electronic device 100 can perform image segmentation on the preview image 202 to generate the segmentation mask 212. The segmentation mask 212 depicts a mask of the subject 204 and reflects the shape and particular posture of the subject depicted in the preview image 202. In some examples, the electronic device 100 can generate a preview image 210 depicting the segmentation mask 212 in the scene of the preview image 202. In some cases, the electronic device 100 can display the preview image 210 depicting the segmentation mask 212 for preview by the subject, and/or can send the preview image 210 to another electronic device, such as a mobile device of the subject.

The electronic device 100 can use the segmentation mask 212 to determine whether the particular posture of the subject 204 as depicted in the preview image 202 matches (or substantially matches) any postures from a set of user postures stored at the electronic device 100. In some cases, the electronic device 100 can compare the segmentation mask 212 to the set of user postures stored at the electronic device 100 and, based on the comparison, determine respective scores for respective postures from the set of user postures. For example, the electronic device 100 can compare an outline of the segmentation mask 212 with outlines of the set of user postures to determine scores for the set of user postures based on match results. The respective scores can indicate how much and/or how well the respective postures match the segmentation mask 212. For example, the score determined for a respective posture can increase as the match between the respective posture and the segmentation mask 212 increases, and can decrease as the match between the respective posture and the segmentation mask 212 decreases.

In some cases, the electronic device 100 can recommend to the subject the posture from the set of user postures having the highest score, or the top n number of postures with the top n scores. The electronic device 100 can then assist the subject in achieving the posture with the highest score or a posture selected by the subject from the recommended postures. For example, the electronic device 100 can generate feedback for the subject to help or guide the subject in achieving the posture with the highest score or the posture selected by the subject. In some cases, the electronic device 100 can generate the feedback while the subject poses for the photograph and attempts to achieve a posture that matches (or significantly matches) the posture with the highest score or the posture selected by the subject. To illustrate, the electronic device 100 can generate feedback for the subject indicating that the subject should adjust the subject's posture in a particular way or move one or more body parts in a particular way, in order to better match the posture with the highest score or the posture selected by the subject.

FIG. 2B is a diagram illustrating an example preview image 222 of a group of subjects 230-238 being photographed by the electronic device 100 and segmentation masks 242-250 generated based on the preview image 222. The preview image 222 shows the subjects 230-238 in the group posing for a photograph in particular postures. The electronic device 100 can perform image segmentation on the preview image 222 to generate the segmentation masks 242-250. The segmentation masks 242-250 depict masks of the subjects 230-238 and reflect the shape and particular postures of the subjects depicted in the preview image 222. In some examples, the electronic device 100 can generate a preview image 240 depicting the segmentation masks 242-250 in the scene of the preview image 222. In some cases, the electronic device 100 can display the preview image 240 depicting the segmentation masks 242-250 for preview by one or more of the subjects 230-238, and/or can send the preview image 240 to one or more other electronic devices, such as one or more mobile devices of one or more of the subjects 230-238.

The electronic device 100 can use the segmentation masks 242-250 to determine whether any of the particular postures of the subjects 230-238 as depicted in the preview image 222 match (or substantially match) any postures from a set of user postures stored at the electronic device 100. In some cases, the electronic device 100 can compare the segmentation masks 242-250 to the set of user postures stored at the electronic device 100 and, based on the comparison, determine respective scores for respective postures from the set of user postures. For example, the electronic device 100 can compare an outline of each of the segmentation masks 242-250 with outlines of the set of user postures to determine scores for the set of user postures based on match results. The respective scores can indicate how much and/or how well the respective postures match the segmentation masks 242-250. For example, the score determined for a respective posture can increase as the match between the respective posture and a segmentation mask from the segmentation masks 242-250 increases, and can decrease as the match between the respective posture and the segmentation mask from the segmentation masks 242-250 decreases.

As shown in FIG. 2B, the segmentation masks 242-250 depict variations between the postures of the subjects 230-238. For example, segmentation mask 244 and the segmentation mask 250 show that subjects 232 and 238 have a different stance than the subjects 230, 234, and 236. In some cases, the subjects 230-238 may want to have a similar posture in the group photograph or one or more different postures than shown in the preview image 222. The electronic device 100 can use the segmentation masks 242-250 and the set of user postures in storage to adjust one or more postures of one or more of the subjects 230-238 or provide feedback to help the subjects 230-238 pose in a manner that matches (or substantially matches) one or more postures from the set of user postures in storage.

In some cases, the electronic device 100 can recommend to the subjects 230-238 a posture from the set of user postures having the highest score, or the top n number of postures with the top n scores. The electronic device 100 can assist the subjects 230-238 to achieve the posture with the highest score or one or more postures selected by one or more of the subjects 230-238 from the recommended postures. For example, the electronic device 100 can generate feedback for one or more of the subjects 230-238 to help or guide the one or more subjects in achieving the posture with the highest score or the one or more postures selected by the one or more subjects. In some cases, the electronic device 100 can generate the feedback while the subjects 230-238 pose for a group photograph and attempt to achieve a posture(s) that matches (or significantly matches) the posture with the highest score or the one or more postures selected by the one or more subjects. To illustrate, the electronic device 100 can generate feedback for the subjects 230-238 indicating that one or more of the subjects 230-238 should adjust their posture in a particular way or move one or more body parts in a particular way, in order to better match the posture with the highest score or the one or more postures selected by the one or more subjects.

Figure 3:
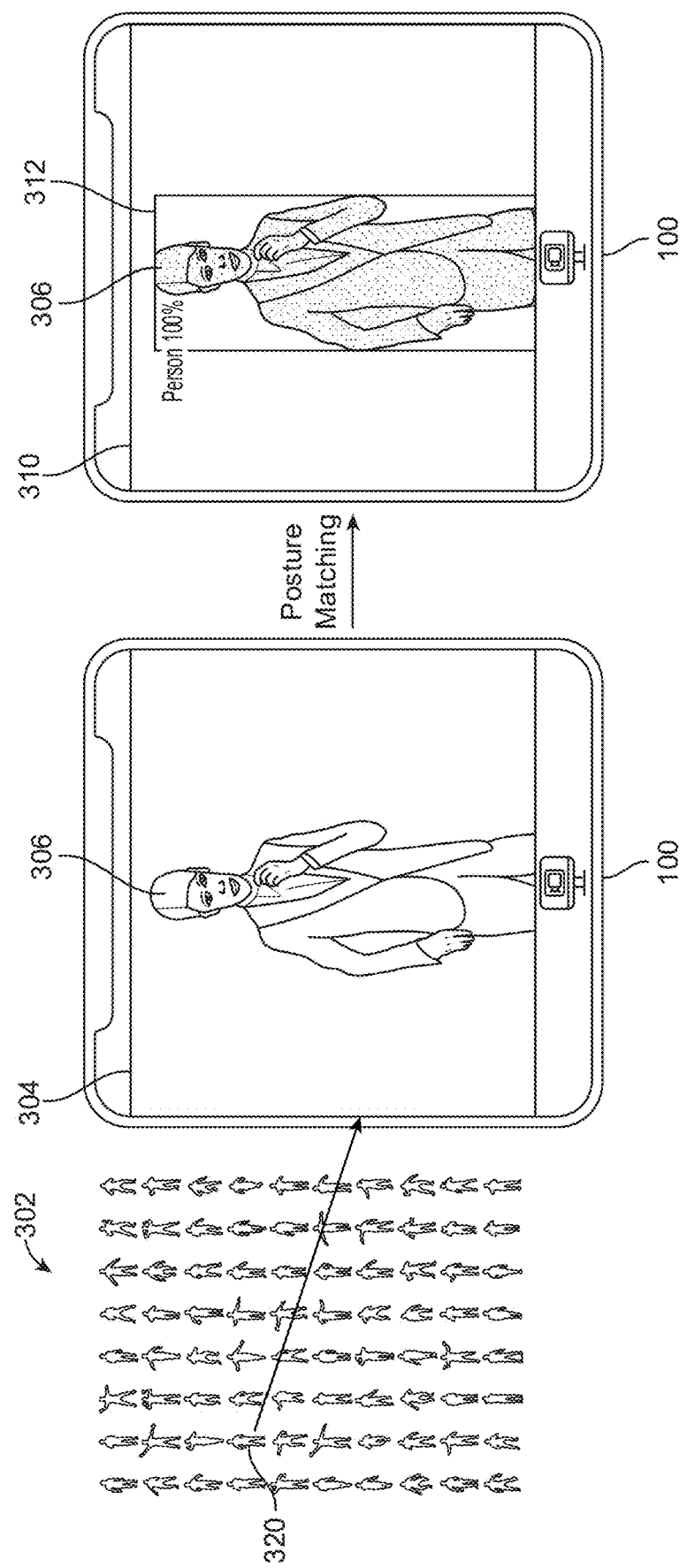
FIG. 3 is a diagram illustrating an example implementation of a posture mode, in accordance with some examples of the present disclosure.

FIG. 3 is a diagram illustrating an example implementation of a posture mode. In some examples, the electronic device 100 can automatically enable the posture mode when it detects a face of a subject in a preview image. For example, when the electronic device 100 generates a preview image of a subject(s), the electronic device 100 can perform face detection on the preview image and automatically enable the posture mode upon detecting a face(s) in the preview image. In other examples, a user of the electronic device 100 can manually enable posture mode from a camera application or a device control or setting.

When the electronic device 100 is in posture mode, a user (e.g., the subject 306 or a user of the electronic device 100) can select, from a set of user postures 302, a posture for a photograph of the subject 306. For example, the subject 306 can select a posture from the set of user postures 302 that the subject 306 wishes to match when taking a photograph. The set of user postures 302 can include previous postures of a subject 306 from previous photographs of the subject 306, professional postures (e.g., postures of subjects from photographs taken by one or more professional photographers, postures of subjects in professional photographs, postures of a particular subject such as subject 306 from professional photographs, postures from a template of postures, etc.), a set of stick figures in particular postures (e.g., stick figures depicting particular postures), and/or any other set of user postures.

In the illustrative example shown in FIG. 3, the subject 306 has selected posture 320 from the set of user postures 302. In some examples, the selected posture 320 can include a posture depicted in a photograph of the subject 306 or another subject obtained and/or selected from a photo gallery in the electronic device 100, a photo gallery of another device, or a photo sharing and/or storage service such as, for example, a cloud-based photo sharing and/or storage service. In some cases, the electronic device 100 can convert a photograph (e.g., from a photo gallery of the electronic device 100, a photo gallery of another device, a photograph from photo sharing and/or storage service, etc.) into a stick figure (e.g., a posture stick figure) depicting the selected posture 320, and store the stick figure as part of the set of user postures.

In some cases, a photograph associated with the selected posture 320 (e.g., a photograph depicting the selected posture 320, a photograph used to create a stick figure depicting the selected posture 320, a photograph used to create a representation of the selected posture 320, etc.) can be a scene-based photograph and/or a subject-based photograph. For example, the photograph associated with the selected posture 320 can be selected based on a scene of the photograph (e.g., because the scene of the photograph is similar or the same as the scene of the photograph being taken, because of a scene preference, because of one or more characteristics of the scene of the photograph and/or the subject(s) being photographed such as a mood of the subject(s) or a pattern in the scene, etc.), the subject in the photograph associated with the selected posture 320, and/or the subject 306.

After the subject 306 attempts to pose in the selected posture 620, the electronic device 100 can capture (e.g., in response to a user input or automatically upon detecting a trigger such as a detection of a face of the subject 306 and/or a pose of the subject 306) a preview image 304 of the subject 306 in the particular posture of the subject 306. The electronic device 100 can then perform image segmentation to generate a preview image 310 depicting the subject 306. For example, the electronic device 100 can perform image segmentation to determine which portions (e.g., which pixels) of the preview image 304 correspond to the subject 306.

The electronic device 100 can use the image segmentation results to generate a preview image 310 depicting the subject 306 with an outline of the posture 320. For example, as shown in FIG. 3, the electronic device 100 can generate the preview image 310 depicting the subject 306 with an outline and a bounding box 312 generated based on the image segmentation. In some cases, the outline can include an outline of the posture 320. In some cases, the outline can include an outline of the subject 306 in the preview image 310. In other cases, the preview image 310 can include an outline of the subject 306 and an outline of the posture 320. In some examples, the outline of the posture 320 can be aligned with the outline of the subject 306 to depict any overlap or misalignment between the outline of the posture 320 and the outline of the subject 306.

In some examples, the electronic device 100 can compare the portions (e.g., pixels) of the preview image 310 corresponding to the subject 306 (e.g., as determined based on the image segmentation results) with the posture 320 selected by the subject 306. The electronic device 100 can use the comparison to determine a match between the posture of the subject 306 in the preview image 310 and the posture 320. For example, the electronic device 100 can compare a portion of the preview image 310 depicting the subject 306 with the posture 320, and determine a match or misalignment between the posture of the segmented subject in the preview image 310 and the posture 320. In some cases, the electronic device 100 can use the comparison to determine a score indicating how much and/or how well the posture of the subject 306 matches the selected posture 320.

In some examples, the electronic device 100 can use the score and/or the comparison results to provide feedback to the subject 306. The feedback can help the subject 306 adjust the posture of the subject 306 to better match the posture 320. In some cases, the preview image 310 can include an indication of a matching score associated with the posture 320 and/or a matching amount between the posture 320 and the posture of the subject 606 in the preview image 310. For example, the preview image 310 can display a percent match between the posture 320 and the posture of the subject 606 in the preview image 310.

In some cases, the preview image 310 can depict one or more recommendations for adjusting the posture of the subject 306 to better match the posture 320. For example, the electronic device 100 can determine any aspects of the posture of the subject 306 that do not match (e.g., are misaligned with) the posture 320, and generate feedback with instructions on how to adjust those aspects of the posture of the subject 306 to better match the posture 320. To illustrate, the electronic device 100 can determine that a position of the subject 306 and/or a body part(s) of the subject 306 (e.g., a hand, the head, a leg, etc.) is/are not aligned with the posture 320 and/or the same body part(s) reflected in the posture 320, and can generate a recommendation to adjust the position, angle, height, placement, direction, gesture, and/or any other aspects of the subject's posture and/or the body part(s) to better match the posture 320.

Figure 4:
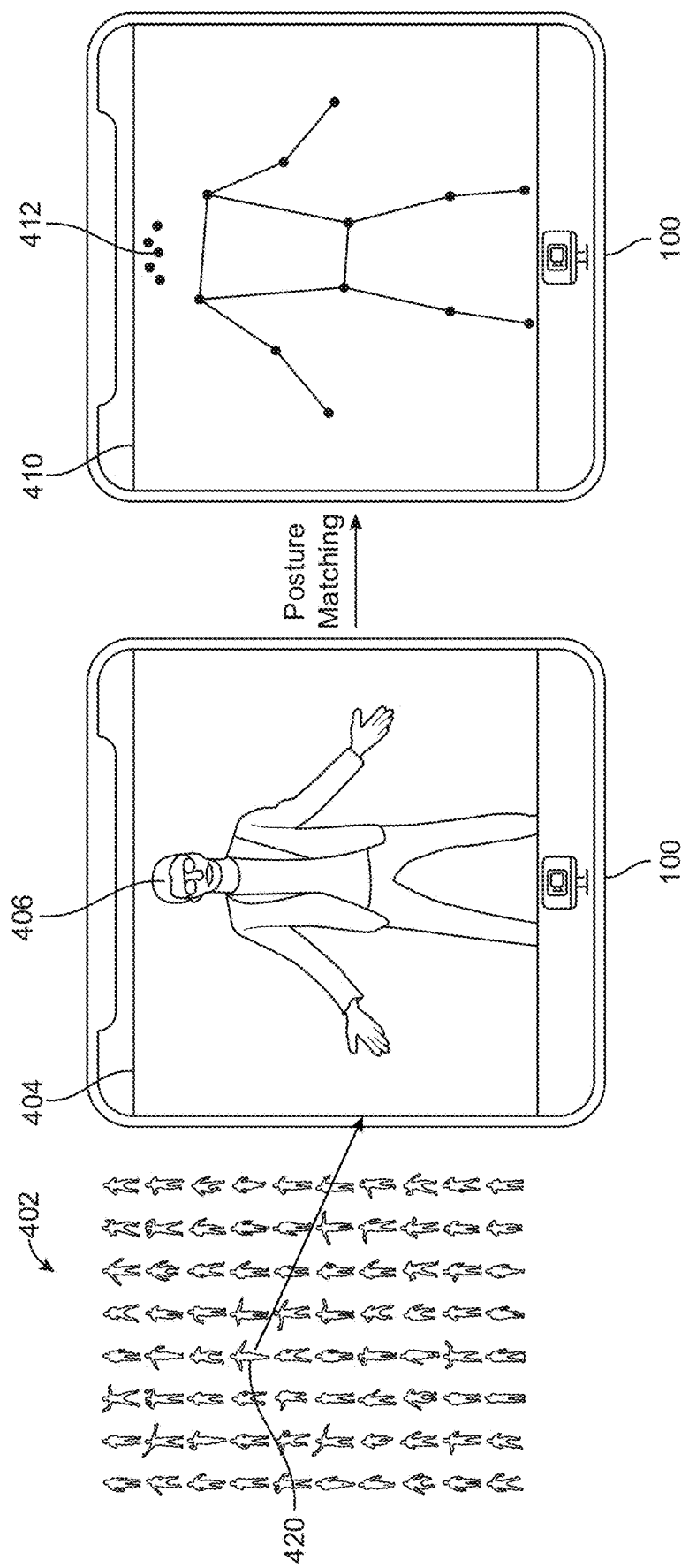
FIG. 4 is a diagram illustrating another example implementation of a posture mode, in accordance with some examples of the present disclosure.

FIG. 4 is a diagram illustrating another example implementation of a posture mode. In this example, the electronic device 100 depicts a preview image 404 of a subject 406 in a particular posture. The electronic device 100 can perform image segmentation and implement a pose estimation algorithm to determine a posture of the subject 406. For example, in some cases, the electronic device 100 can perform image segmentation to detect the portions of the preview image 404 that include the subject 406. The electronic device 100 can implement a machine learning model, such as a PoseNet model, to determine a posture of the subject 406 reflected in the portions of the preview image that include the subject 406. In this example, the electronic device 100 depicts a representation 412 of the subject 406 in the detected posture.

The representation 412 of the subject 406 can include a stick figure in the detected posture, a segmentation mask of the subject 406 in the detected posture, a segmented portion of the preview image 404 depicting the subject 406 in the detected posture, or any other representation of the subject 406 in the detected posture. In the illustrative example of FIG. 4, the representation 412 is a stick figure in the detected posture.

The subject 406 can select a posture from the set of user postures 402 that the subject 406 wishes to match when taking a photograph. For example, as shown in FIG. 4, the subject 406 has selected the posture 420 from the set of user postures 402. The electronic device 100 can compare the representation 412 of the subject 406 in the preview image 410 to the posture 420 selected by the subject 406. The electronic device 100 can use the comparison to determine a score indicating how much and/or how well the posture of the subject 406 matches the selected posture 420. For example, the electronic device 100 can compare the representation 412 of the subject 406 with the posture 420, and determine that a match or misalignment between the posture reflected by the representation 412 in the preview image 410 and the posture 420.

In some examples, the electronic device 100 can use the score and/or the comparison results to provide feedback to the subject 406 to help the subject 406 better match the posture 420. In some cases, the preview image 410 can include an indication of the matching score associated with the posture 420 and/or a matching amount between the posture 420 and the posture reflected by the representation 412 of the subject 406. For example, the preview image 410 can display a percent match between the posture 420 and the posture reflected by the representation 412 of the subject 406.

In some examples, the preview image 410 can depict one or more recommendations for adjusting the posture of the subject 406 to better match the posture 420. For example, the electronic device 100 can determine any aspects of the posture of the subject 406 that do not match (e.g., are misaligned with) the posture 420, and generate feedback with instructions on how to adjust those aspects of the posture of the subject 406 to better match the posture 420. To illustrate, the electronic device 100 can determine that a position of the subject 406 or a body part(s) of the subject 406 (e.g., a hand, the head, a leg, etc.) is/are not aligned with the posture 420 and/or that body part as reflected in the posture 420. The electronic device 100 can then generate a recommendation to adjust the position, angle, height, placement, direction, gesture, and/or any other aspects of the subject's posture and/or the body part to better match the posture 420.

Figure 5:
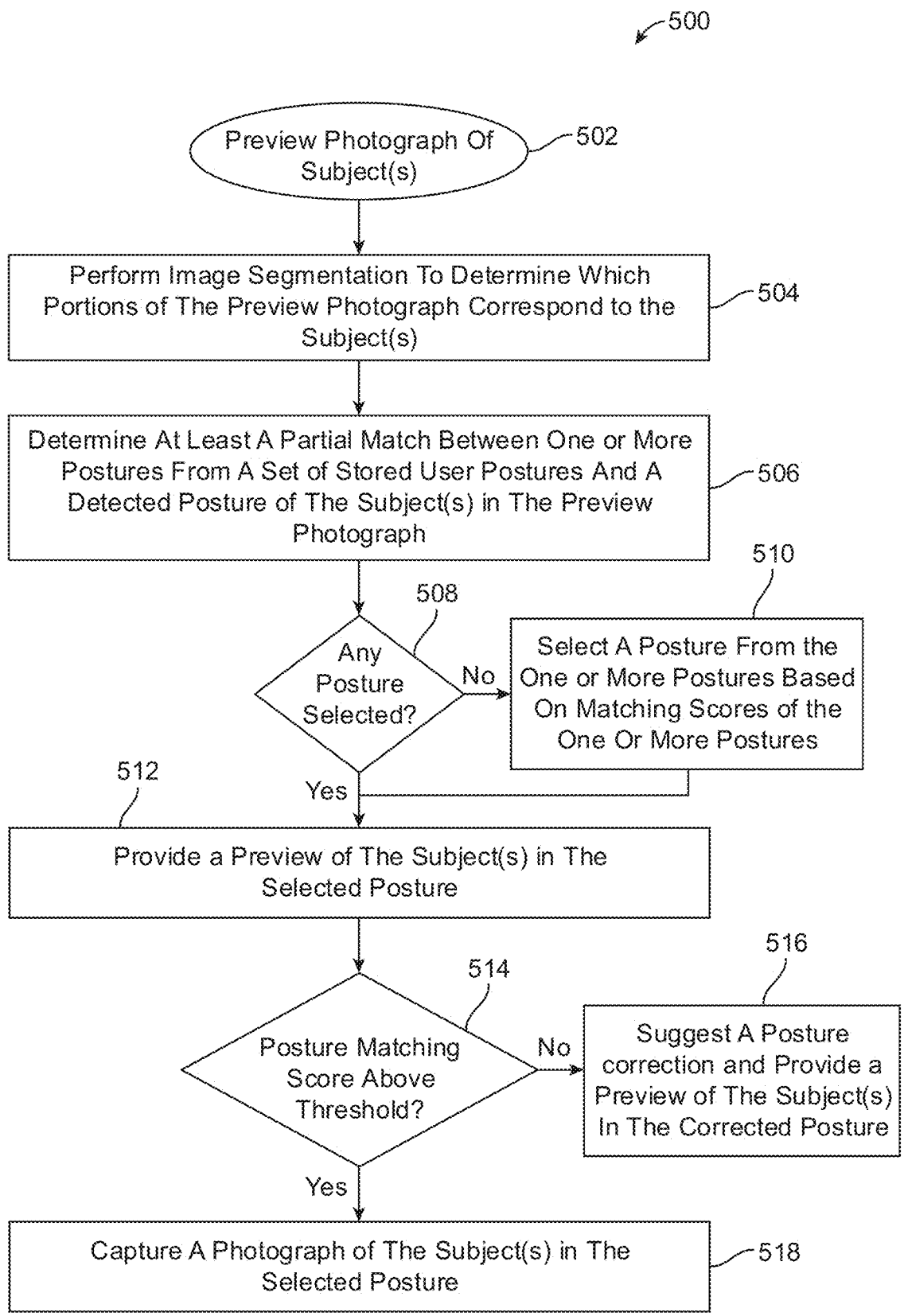
FIG. 5 is a flowchart illustrating an example process for implementing a posture mode, in accordance with some examples of the present disclosure.

FIG. 5 is a flowchart illustrating an example process 500 for implementing a posture mode. At block 502, the process 500 can include generating a preview photograph of a subject(s) to be photographed. The preview photograph can depict the subject(s) in a particular posture, which the electronic device 100 can use to generate feedback for adjusting the posture of the subject(s) for the photograph to better match a selected posture from a set of user postures stored by the electronic device 100.

At block 504, the process 500 can include performing image segmentation to determine which portions of the preview photograph correspond to the subject(s). For example, the process 500 can implement an algorithm/model, such as a machine learning model, to perform human image segmentation to identify which pixels of the preview photograph correspond to the subject(s).

At block 506, the process 500 can include determining at least a partial match between one or more postures from the set of stored user postures (e.g., stored on the electronic device 100) and a detected posture of the subject(s) in the preview photograph. In some cases, determining at least a partial match between one or more postures from the set of stored user postures and the detected posture of the subject(s) in the preview photograph can include detecting the posture of the subject(s). In some examples, the electronic device 100 can determine the posture of the subject(s) using a machine learning algorithm, such as a self-learning machine learning algorithm.

In some cases, determining at least a partial match between one or more postures from the set of stored user postures and the detected posture of the subject(s) in the preview photograph can include comparing the detected posture of the subject(s) in the preview photograph with the set of stored user postures. In some examples, the electronic device 100 can compare the detected posture of the subject(s) in the preview photograph with the set of stored user postures, and determine a score for each of the postures in the set of stored user postures. The score for a posture from the set of stored user postures can indicate how much of the detected posture of the subject(s) matches the posture from the set of stored user postures. For example, the score for a posture from the set of stored user postures can indicate an amount of overlap, alignment, and/or match between the detected posture of the subject(s) and the posture from the set of stored user postures. In some examples, the score can include a percentage value or a ratio reflecting a percent overlap or matching ratio between the detected posture of the subject(s) and the posture from the set of stored user postures. In other examples, the score can include any other type of value, such as a numeric value, a text value (e.g., high, medium, low), etc.

In some cases, the one or more postures from the set of stored user postures can include the top n number of postures from the set of stored user postures. For example, the one or more postures can include the postures from the set of stored user postures having the top n scores (e.g., the top n number of matches) determined based on a comparison between the detected posture of the subject(s) and the set of stored user postures. In some cases, the electronic device 100 can present the one or more postures via a display of the electronic device 100 and/or send the one or more postures to one or more devices associated with the subject(s).

At block 508, the process 500 can include determining whether any of the one or more postures have been selected by the subject(s). For example, as previously mentioned, the electronic device 100 can present the one or more postures via a display of the electronic device 100 and/or send the one or more postures to one or more devices associated with the subject(s). The subject(s) can review the one or more postures and select a particular posture from the one or more postures. The selected posture can be a posture that the subject(s) wants to have when photographed using the electronic device 100.

If the subject(s) does select a posture at block 508, the process 500 can proceed to block 512. If, on the other hand, the subject(s) does not select a posture from the one or more postures, the process 500 can include, at block 510, selecting a posture from the one or more postures based on matching scores determined for the one or more postures (e.g., scores determined for the one or more postures based on a determined matching/overlapping amount between each of the one or more postures and the detected posture of the subject(s)). For example, in some cases, if the subject(s) does not select a posture at block 508, the electronic device 100 can select the highest matching posture from the one or more postures. After selecting the posture at block 510, the process 500 can proceed to block 512.

At block 512, the process 500 can include providing a preview of the subject(s) in the selected posture. For example, the electronic device 100 can display the subject(s) in the selected posture and/or send, to one or more devices associated with the subject(s), a preview image of the subject(s) in the selected posture. In some cases, the preview of the subject(s) in the selected posture can include one or more suggested posture corrections from the electronic device 100 (e.g., determined by the electronic device 100). For example, the preview of the subject(s) in the selected posture can display an indicia identifying one or more body parts of the subject(s) and one or more suggested posture corrections associated with the one or more body parts. The indicia can include, for example and without limitation, a pop-up message on one or more body parts of the subject(s), an instruction(s) for how to adjust the position of the subject(s) and/or one or more body parts, one or more arrows depicting a suggested movement or repositioning of the subject(s) and/or one or more body parts to better match the selected posture, and/or any other indicia.

At block 514, the process 500 can optionally include determining whether the posture matching score of the selected posture (e.g., the score calculated for the selected posture based on a match or matching amount between the selected posture and the detected posture of the subject(s)) is above a threshold. If the posture matching score of the selected posture is above the threshold, the process 500 can proceed to block 518. On the other hand, if the posture matching score of the selected posture is not above the threshold, at block 516, the process 500 can include suggesting a posture correction and providing to the subject(s) a preview of the subject(s) in the corrected posture. For example, the electronic device 100 can display the suggested the posture correction and/or send the suggested posture correction to one or more devices associated with the subject(s). The electronic device 100 can capture a preview image of the subject(s) in the corrected posture and provide to the subject(s) a preview image of the subject(s) in the corrected posture.

At block 518, the process 500 can include capturing a photograph of the subject(s) in the selected posture (or the corrected posture if a correction is performed at block 516). In some examples, capturing a photograph of the subject(s) in the selected posture (or the corrected posture if a correction is performed at block 516) can include enabling or allowing a user to capture the photograph of the subject(s) in the selected posture (or the corrected posture if a correction is performed at block 516).

Figure 6:
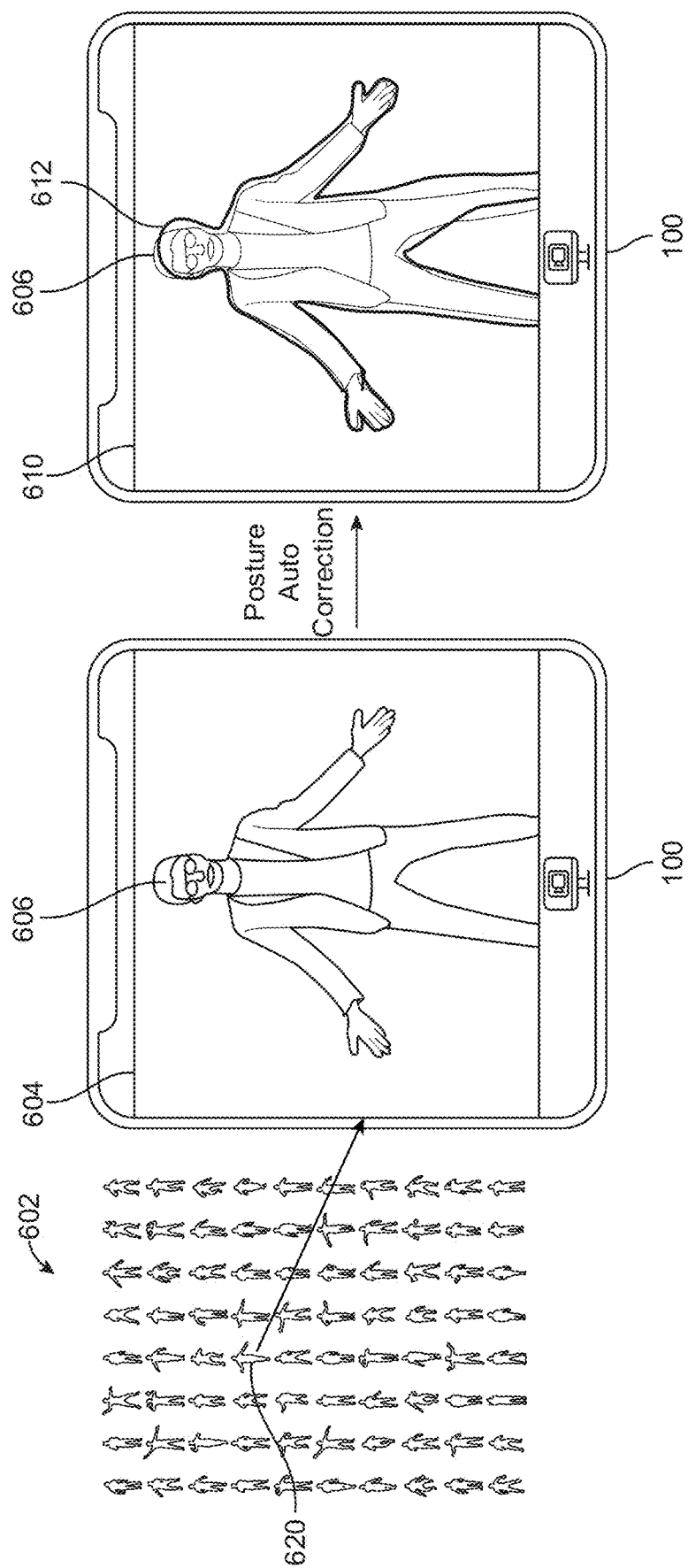
FIG. 6 is a diagram illustrating an example of an automatic pose correction performed as part of a posture mode of an electronic device, in accordance with some examples of the present disclosure.

FIG. 6 is a diagram illustrating an example of an automatic pose correction performed as part of a posture mode of the electronic device 100 (or a camera device of the electronic device 100). In some examples, the electronic device 100 can automatically enable posture mode when it detects a face of a subject in a preview image. For example, when the electronic device 100 generates a preview image of a subject(s), the electronic device 100 can perform face detection on the preview image and automatically enable the posture mode upon detecting a face(s) in the preview image. In other examples, a user of the electronic device 100 can manually enable posture mode from a camera application or a device setting.

When the electronic device 100 is in posture mode, a user of the electronic device 100 can select a posture for a photograph from a set of user postures 602. The set of user postures 602 can include previous postures of a subject 606 from previous photographs of the subject 606, professional postures (e.g., postures of subjects from photographs taken by one or more professional photographers, postures of subjects in professional photographs, postures of a particular subject such as subject 606 from professional photographs, postures from a template of postures, etc.), a set of stick figures in particular postures (e.g., stick FIGS. depicting particular postures), and/or any other set of user postures.

In FIG. 6, the subject 606 has selected posture 620. After the subject 606 attempts to pose in the selected posture 620, the electronic device 100 can capture (e.g., in response to a user input or automatically upon detecting a trigger such as a detection of a face of the subject 606 and/or a pose of the subject 606) a preview image 604 of the subject 606 in the particular posture of the subject 606. In some examples, the electronic device 100 can perform image segmentation to determine which portions of the preview image 604 correspond to the subject 606. For example, the electronic device 100 can perform image segmentation to determine which pixels of the preview image 604 correspond to the subject 606. The electronic device 100 can compare the portions of the preview image 604 corresponding to the subject 606 with the posture 620 to determine any misalignment between the posture 620 and the posture of the subject 606 in the preview image 604. In some examples, the electronic device 100 can compare the portions of the preview image 604 corresponding to the subject 606 with the posture 620 to determine an overlap between the posture 620 and the posture of the subject 606 in the preview image 604, and/or a misalignment between the posture 620 and the posture of the subject 606 in the preview image 604.

Based on any misalignment between the posture 620 and the posture of the subject 606 in the preview image 604, the electronic device 100 can perform automatic posture correction to bring the posture of the subject 606 within (or substantially within) an outline 612 of the posture 620. In some examples, the electronic device 100 can perform image processing to adjust the posture of the subject 606 in the image to bring the posture of the subject 606 within (or substantially within) the outline 612 of the posture 620.

In some cases, the electronic device 100 can generate an image 610 depicting the subject 606 in the particular posture and the outline 612 of the posture 620. The outline 612 can be aligned with and/or overlaid over the subject 606 in the image 610 to depict any misalignment between the posture of the subject 606 in the image 610 and the posture 620. In some cases, the electronic device 100 can determine any misalignment between the outline 612 of the posture 620 and an outline of the posture of the subject 606 in the image 610, and perform image processing to adjust the posture of the subject 606 in the image 610 according to the outline 612 of the posture 620.

For example, the electronic device 100 can correct any misalignment between the outline 612 of the posture 620 and an outline of the posture of the subject 606 in the image 610 to bring the posture of the subject 606 in the image 610 within (or substantially within) the outline 612 of the posture 620. In some cases, once the electronic device 100 performs the automatic posture correction, the electronic device 100 can output an image of the subject 606 in the corrected/adjusted posture and/or store the image of the subject 606 in the corrected/adjusted posture.

In some cases, once the electronic device 100 performs the automatic posture correction, the electronic device 100 can request that a user of the electronic device 100 (e.g., the subject 606 or a user taking the photograph of the subject 606) accept or reject the image of the subject 606 in the corrected/adjusted posture. If the user accepts the image of the subject 606 in the corrected/adjusted posture, the electronic device 100 can output and/or store the image as previously explained. If the user rejects the image of the subject 606 in the corrected/adjusted posture, the electronic device 100 can further adjust the posture of the subject 606 in the image, enable the subject 606 to retake the photograph, and/or request input from a user (e.g., the subject 606 and/or a user taking the photograph from the electronic device 100) such as, for example, an input requesting a particular posture adjustment, an input requesting one or more imaging effects, and input requesting certain processing of the image, and/or any other inputs.

Figure 7:
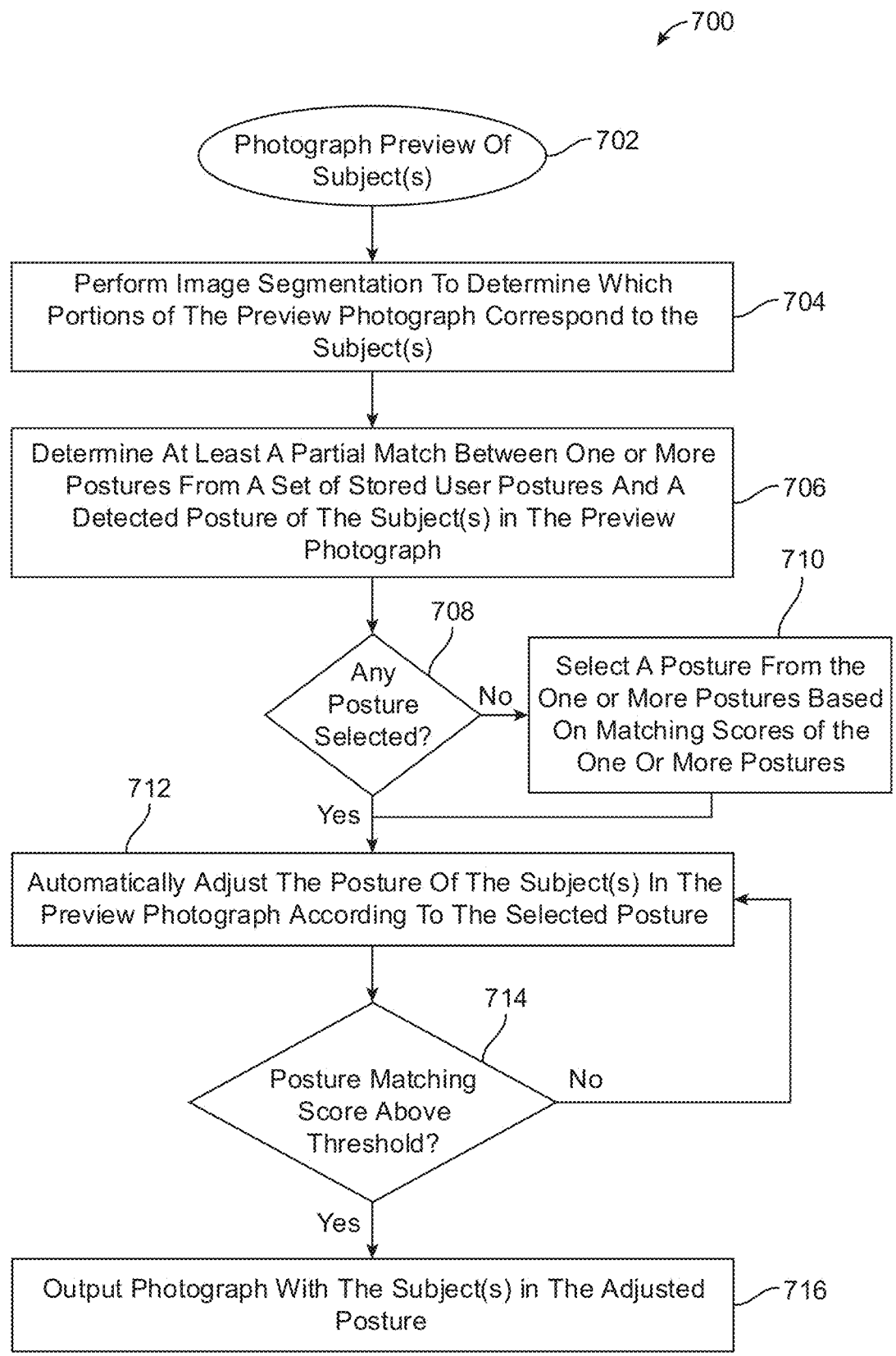
FIG. 7 is a flowchart illustrating an example process for performing automatic posture correction as part of a posture mode of an electronic device, in accordance with some examples of the present disclosure.

FIG. 7 is a flowchart illustrating an example process 700 for performing automatic posture correction as part of a posture mode of the electronic device 100 (or a camera device of the electronic device 100). In some examples, a subject(s) can select a particular posture from a set of stored user postures (e.g., stored on an electronic device such as electronic device 100), as previously explained. The selected posture can be a posture that the subject(s) wishes to pose in for a photograph.

At block 702, the process 700 can include generating a preview photograph of the subject(s) to be photographed. The preview photograph can depict a posture of the subject(s), which the electronic device 100 can automatically correct to better align with the selected posture.

At block 704, the process 700 can include performing image segmentation to determine which portions of the preview photograph correspond to the subject(s). For example, the process 700 can implement an algorithm/model, such as a machine learning model, to perform human image segmentation to identify which pixels of the preview photograph correspond to the subject(s).

At block 706, the process 700 can include determining at least a partial match between one or more postures from the set of stored user postures and a detected posture of the subject(s) in the preview photograph. In some cases, determining at least a partial match between one or more postures from the set of stored user postures and the detected posture of the subject(s) in the preview photograph can include determining the posture of the subject(s). In some examples, the electronic device 100 can determine the posture of the subject(s) using a machine learning algorithm.

In some cases, determining at least a partial match between one or more postures from the set of stored user postures and the detected posture of the subject(s) in the preview photograph can include comparing the detected posture of the subject(s) in the preview photograph with the set of stored user postures. In some examples, the electronic device can compare the detected posture of the subject(s) in the preview photograph with the set of stored user postures, and determine a score for each of the postures in the set of stored user postures. The score for a posture from the set of stored user postures can indicate how much of the detected posture of the subject(s) matches the posture from the set of stored user postures.

For example, the score for a posture from the set of stored user postures can indicate an amount of overlap, match, and/or alignment between the detected posture of the subject(s) and the posture from the set of stored user postures. In some cases, the score can include a percentage value or a ratio reflecting a percent overlap or matching ratio between the detected posture of the subject(s) and the posture from the set of stored user postures. In other cases, the score can include any other type of value, such as a numeric value, a text value (e.g., high, medium, low), etc.

In some examples, the one or more postures from the set of stored user postures can include the top n number of postures from the set of stored user postures. For example, the one or more postures can include the postures from the set of stored user postures having the top n scores (e.g., the top n number of matches) determined based on a comparison between the detected posture of the subject(s) and the set of stored user postures. In some cases, the electronic device 100 can present the one or more postures via a display of the electronic device 100 and/or send the one or more postures to one or more devices associated with the subject(s).

At block 708, the process 700 can include determining whether any of the one or more postures have been selected by the subject(s). For example, as previously mentioned, the electronic device 100 can present the one or more postures via a display of the electronic device 100 and/or send the one or more postures to one or more devices associated with the subject(s). The subject(s) can review the one or more postures and select a particular posture from the one or more postures. The selected posture can be a posture that the subject(s) wants to have when photographed by the electronic device 100.

If the subject(s) does select a posture at block 708, the process 700 can proceed to block 712. If, on the other hand, the subject(s) does not select a posture from the one or more postures, the process 700 can include, at block 710, selecting a posture from the one or more postures based on matching scores determined for the one or more postures (e.g., scores determined for the one or more postures based on a determined matching amount or overlap between each of the one or more postures and the detected posture of the subject(s)). For example, in some cases, if the subject(s) does not select a posture at block 708, the electronic device 100 can select the highest matching posture from the one or more postures. After selecting the posture at block 710, the process 700 can proceed to block 712.

At block 712, the process 700 can include automatically adjusting the posture of the subject(s) in the preview photograph to better align with and/or match the selected posture. In some examples, the electronic device 100 can automatically adjust the posture using a machine learning algorithm. For example, in some cases, the electronic device 100 can use a machine learning algorithm to adjust the posture of the subject(s) in the preview photograph to bring an outline of the posture of the subject(s) within (or substantially within) an outline of the selected posture.

In some examples, the electronic device 100 can make any automatic posture adjustments by deforming one or more portions of the preview photograph into alignment (or better alignment) with the selected posture. For example, the electronic device 100 can deform a shape(s) in the photograph corresponding to the subject(s) in the preview photograph into alignment (or better alignment) with one or more shape(s) of the selected posture. In some cases, the electronic device 100 can make any automatic posture adjustments by performing pixel coordinate transformations on the preview photograph to better match the posture of the subject(s) in the preview photograph to the selected posture.

At block 714, the process 700 can optionally include determining whether a posture matching score of the selected posture is above a threshold. The posture matching score can include a score calculated for the selected posture based on an overlap or matching amount between the selected posture and the automatically-adjusted posture of the subject(s). If the posture matching score of the selected posture is above the threshold, the process 700 can proceed to block 716. On the other hand, if the posture matching score of the selected posture is not above the threshold, the process 700 can return to block 712, where the electronic device 100 re-adjusts the posture of the subject(s) to better align and/or match with the selected posture.

At block 716, the process 700 can include outputting a photograph of the subject(s) in the automatically-adjusted posture. In some examples, the electronic device 100 can store the photograph of the subject(s) and/or send the photograph of the subject(s) to one or more devices, such as one or more devices of the subject(s).

Figure 8A:
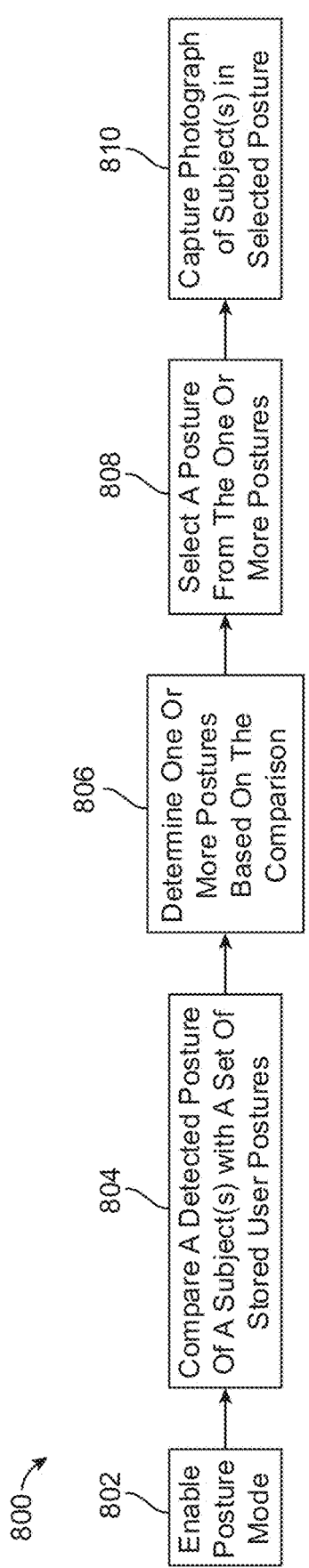
FIG. 8A is a flowchart illustrating an example process for determining a posture for a photograph of a subject(s), in accordance with some examples of the present disclosure.

FIG. 8A is a flowchart illustrating an example process 800 for determining a posture for a photograph of a subject(s). At block 802, the process 800 can include enabling posture mode on a camera device (e.g., camera 102, camera 104) of the electronic device 100. In some examples, the electronic device 100 can automatically enable the posture mode on the camera device when it detects a face of a subject(s) in a preview image. For example, when the electronic device 100 generates a preview image of a subject(s), the electronic device 100 can perform face detection on the preview image and automatically enable the posture mode upon detecting a face(s) in the preview image. In other examples, a user of the electronic device 100 can manually enable posture mode from a camera application, a device control, or a device setting.

At block 804, the process 800 can include comparing a detected posture of a subject(s) with a set of stored user postures. For example, the subject(s) can pose for a photograph and the electronic device 100 can capture a preview image of the subject(s) posing for the photograph. The electronic device 100 can then detect the posture of the subject(s) from the preview image of the subject(s) and compare the detected posture of the subject(s) with the set of stored user postures. In some cases, comparing the detected posture of the subject(s) with the set of stored user postures can further include determining, based on the comparison, a matching score for each of the set of stored user postures, as previously described.

In some cases, if the photograph is a group photograph with multiple subjects, the process 800 at block 804 can include detecting the postures of the subjects in the preview image and comparing the postures with the set of stored user postures. In some examples, the process 800 can include determining respective scores of the set of stored user postures based on comparisons between the detected postures and the set of stored user postures.

At block 806, the process 800 can include determining one or more postures from the set of stored user postures based on the comparison. For example, the electronic device 100 can determine the one or more postures from the set of stored user postures that best match (e.g., overlap and/or align with) the detected posture of the subject(s). In some cases, the electronic device 100 can determine the one or more postures based on respective matching scores determined for the set of stored user postures. For example, the electronic device 100 can determine the postures having the top n number of matching scores. The one or more postures can include the postures having the top n number of matching scores or the posture having the highest matching score.

In some cases, if the photograph is a group photograph with multiple subjects, the process 800 at block 806 can include determining a single posture for all the subjects in the group photograph or determining multiple postures for multiple subjects in the group photograph.

At block 808, the process 800 can include selecting a posture from the one or more postures. For example, the electronic device 100 can provide the one or more postures to the subject(s) (e.g., by displaying a preview of the one or more postures or an indication of the one or more postures and/or by sending a preview of the one or more postures or an indication of the one or more postures to another device(s) associated with the one or more subject(s)). The subject(s) can view the one or more postures provided by the electronic device 100 and select the posture from the one or more postures that the subject(s) wishes to have when photographed. The electronic device 100 can receive the input selection from the subject(s) and proceed to block 810.

In some cases, if the subject(s) does not want to select any postures from the one or more postures, the subject(s) can provide an input to the electronic device 100 requesting additional postures, requesting to view the set of stored user postures to expand the pool of postures from which the subject(s) can select a posture, selecting a different postures from the set of stored user postures that is not included in the one or more postures, or requesting that the electronic device 100 return to blocks 804 and 806 to determine an additional posture(s) as previously explained.

As illustrated above, the posture can be selected manually by the subject(s) based on a user input. However, in some cases, the posture can be automatically selected by the electronic device 100 based on one or more factors such as, for example and without limitation, matching scores of the one or more postures, learned preferences of the subject(s), the overall scene, a detected mood or emotion of the subject(s), the type of photograph being taken, the number of subjects in the photograph being taken, and/or any other factors.

In some cases, if the photograph is a group photograph with multiple subjects, the process 800 at block 808 can include selecting a single posture for all the subjects in the group photograph or selecting multiple postures for multiple subjects in the group photograph.

At block 810, the process 800 can include capturing a photograph of the subject(s) in the selected posture. In some cases, capturing the photograph of the subject(s) can include enabling the photograph to be captured by a user of the electronic device 100 or enabling the user of the electronic device 100 to set a timer to allow the electronic device 100 to automatically capture the photograph.

In some cases, before capturing the photograph of the subject(s), the electronic device 100 can provide feedback to the subject(s) to help the subject(s) adjust a posture of the subject(s) to better match the selected posture. The electronic device 100 can then capture the photograph of the subject(s) after the subject(s) makes any adjustments to the particular posture based on the feedback provided by the electronic device 100. In some cases, the electronic device 100 can capture the photograph of the subject(s) and subsequently make any automatic posture adjustments. For example, the electronic device 100 can capture the photograph of the subject(s) and automatically make any posture adjustments to the photograph to better match the posture of the subject(s) in the photograph to the selected posture.

In some cases, the electronic device 100 can make any automatic posture adjustments by performing a geometric transformation of one or more portions (e.g., regions and/or pixels) of the photograph corresponding to the subject(s). In some examples, the electronic device 100 can make any automatic posture adjustments by deforming one or more portions of the photograph corresponding to the subject(s) into alignment (or better alignment) with the selected posture. For example, the electronic device 100 can deform a shape(s) in the photograph corresponding to the subject(s) into alignment (or better alignment) with one or more shape(s) of the selected posture. In some cases, the electronic device 100 can make any automatic posture adjustments by performing pixel coordinate transformations on the photograph to better match the posture of the subject(s) in the photograph to the selected posture.

In some examples, the electronic device 100 can capture the photograph of the subject(s) after the subject(s) makes any adjustments to the particular posture based on the feedback provided by the electronic device 100, and automatically make any additional posture adjustments to the photograph to better match the posture of the subject(s) in the photograph to the selected posture.

Figure 8B:
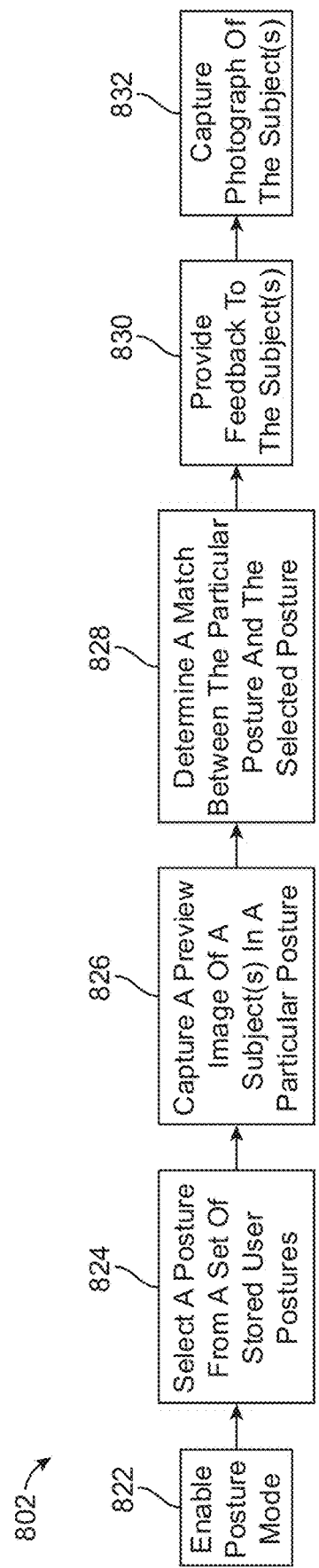
FIG. 8B is a flowchart illustrating another example process for determining a posture for a photograph of a subject(s), in accordance with some examples of the present disclosure.

FIG. 8B is a flowchart illustrating another example process 820 for determining a posture for a photograph of a subject(s). At block 822, the process 820 can include enabling posture mode on a camera device (e.g., camera 102, camera 104) of the electronic device 100, as previously explained with respect to the process 800 shown in FIG. 8A.

At block 824, the process 820 can include selecting a posture from a set of stored user postures. In some cases, if the photograph is a group photograph with multiple subjects, the process 820 at block 824 can include selecting a single posture for all the subjects in the group photograph or selecting multiple postures for multiple subjects in the group photograph.

In some examples, selecting the posture from the set of stored user postures can include receiving a user input selecting a particular posture from the set of stored user postures. For example, the electronic device 100 can provide the set of stored user postures to the subject(s) to allow the subject(s) to select a posture from the set of stored user postures. The subject(s) can view the set of stored user postures provided by the electronic device 100 and select the posture from the set of stored user postures. The electronic device 100 can receive the input selection from the subject(s) and proceed to block 824.

In some examples, the electronic device 100 can provide the set of stored user postures to the subject(s) by displaying the set of stored user postures or displaying an indication (e.g., a description of each posture, an outline of each posture, a representation of each posture, a preview of the postures, etc.) of the set of stored user postures. In other examples, the electronic device 100 can additionally or alternatively provide the set of stored user postures by sending the set of stored user postures or the indication of the set of stored user postures to another device(s) associated with the one or more subject(s)).

At block 826, the process 820 can include capturing a preview image of the subject(s) in a particular posture. In some examples, the subject(s) can pose for the preview image in the particular posture, and the electronic device 100 can capture the preview image with the subject(s) in the particular posture. In some examples, when posing for the preview image, the subject(s) can attempt to mirror the selected posture. Thus, in some cases, the particular posture can be a posture of the subject(s) that attempts to mirror the selected posture.

At block 828, the process 820 can include determining a match between the particular posture of the subject(s) in the preview image and the selected posture. For example, in some cases, the electronic device 100 can detect the particular posture of the subject(s) in the preview image and compare the detected posture of the subject(s) with the selected posture. The electronic device 100 can then determine a matching amount or score between the particular posture of the subject(s) and the selected posture. In some cases, the electronic device 100 can compare the particular posture of the subject(s) with the selected posture and determine, based on the comparison, a matching score between the particular posture of the subject(s) and the selected posture. In some examples, the electronic device 100 can determine the score based on an amount or percentage of overlap, alignment, similarity, and/or correspondence between the particular posture of the subject(s) and the selected posture.

In some cases, if the photograph is a group photograph with multiple subjects, the process 820 at block 828 can include determining a match between the selected posture and one or more postures of one or more of the multiple subjects. For example, in some cases, the electronic device 100 can determine a match between a selected posture and each of the postures of the multiple subjects in the preview image. In some cases, the electronic device 100 can determine a match between a set of selected postures and the postures of the subjects in the group photograph.

At block 830, the process 820 can include providing feedback to the subject(s) based on the determined match between the particular posture of the subject(s) and the selected posture. For example, the electronic device 100 can determine any mismatches or misalignments between the particular posture of the subject(s) and the selected posture, and provide feedback to the subject(s) on how to adjust the particular posture to better match the selected posture. In some cases, the feedback can include instructions for how to make adjustments to the particular posture (e.g., instructions on what adjustments to make) to increase the matching score between the particular posture and the selected posture.

In some cases, the electronic device 100 can provide feedback to the subject(s) until the subject(s) provide an input to the electronic device 100 to proceed with the adjusted posture or until the subject(s) accept the adjusted posture. In other cases, the electronic device 100 can provide feedback to the subject(s) until the adjusted posture of the subject(s) reaches a threshold match (e.g., a threshold score, overlap, alignment, similarity, and/or correspondence) between the adjusted posture and the selected posture.

In some examples, the electronic device 100 can provide the feedback to the subject(s) by displaying the feedback on a display of the electronic device 100 and/or sending the feedback to another device(s) associated with the one or more subject(s)). In some cases, the electronic device 100 can provide the feedback as a message with instructions, an animation illustrating one or more suggested posture adjustments, etc. In some examples, the electronic device 100 can provide the feedback within the preview image of the subject(s). For example, the electronic device 100 can add the feedback to the preview image of the subject(s). The feedback can indicate and/or depict one or more suggested adjustments within the preview image of the subject(s).

In some cases, if the photograph is a group photograph with multiple subjects, the process 820 at block 830 can include providing feedback to one or more subjects in the preview image. For example, in some cases, the electronic device 100 can provide feedback for adjusting each of the postures of the multiple subjects in the preview image to better match the selected posture or a set of selected postures.

At block 832, the process 820 can include capturing a photograph of the subject(s) in the particular posture. In some cases, capturing the photograph of the subject(s) can include enabling the photograph to be captured by a user of the electronic device 100 or enabling the user of the electronic device 100 to set a timer to allow the electronic device 100 to automatically capture the photograph.

In some examples, the electronic device 100 can capture the photograph of the subject(s) after the subject(s) makes any adjustments to the particular posture based on the feedback provided by the electronic device 100. In some cases, the electronic device 100 can capture the photograph of the subject(s) and subsequently make any automatic posture adjustments as previously explained. For example, after the subject(s) makes any adjustments to the particular posture based on the feedback provided by the electronic device 100, the electronic device 100 can capture the photograph of the subject(s) and automatically make any additional posture adjustments to the photograph to better match the posture of the subject(s) in the photograph to the selected posture.

In some cases, the electronic device 100 can make any automatic posture adjustments by performing a geometric transformation of one or more portions (e.g., regions and/or pixels) of the photograph corresponding to the subject(s). In some examples, the electronic device 100 can make any automatic posture adjustments by deforming one or more portions of the photograph corresponding to the subject(s) into alignment (or better alignment) with the selected posture. For example, the electronic device 100 can deform a shape(s) in the photograph corresponding to the subject(s) into alignment (or better alignment) with one or more shape(s) of the selected posture. In some cases, the electronic device 100 can make any automatic posture adjustments by performing pixel coordinate transformations on the photograph to better match the posture of the subject(s) in the photograph to the selected posture.

Figure 9:
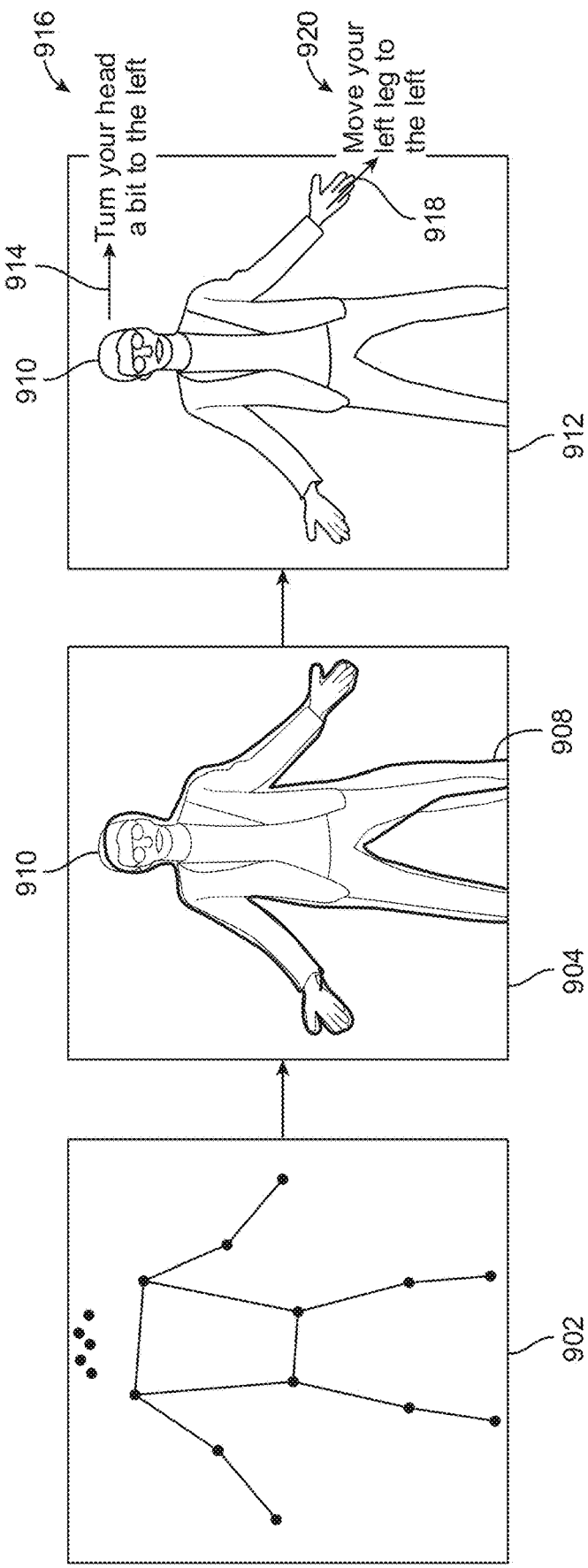
FIG. 9 is a diagram illustrating an example posture adjustment of a subject being photographed, in accordance with some examples of the present disclosure.

FIG. 9 is a diagram illustrating an example posture adjustment of a subject being photographed. As shown, the electronic device 100 can capture a preview image 904 of a subject 910 in a particular posture, and determine a match between the particular posture of the subject 910 and a selected posture 902.

In FIG. 9, the selected posture 902 is a stick figure (e.g., a posture stick figure) depicting a posture for the photograph. In other examples, the selected posture 902 can be any other representation of a posture for the photograph. For example, the selected posture 902 can include a posture depicted in a photograph previously taken of the subject 910 or any other subject. As another example, the selected posture 902 can include a visual representation of posture depicted in a photograph previously taken of the subject 910 or any other subject.

In some cases, the selected posture 902 can include a posture depicted in a photograph of the subject 910 or another subject obtained and/or selected from a photo gallery in the electronic device 100, a photo gallery of another device, or a photo sharing and/or storage service such as, for example, a cloud-based photo sharing and/or storage service. In some cases, the electronic device 100 can convert a photograph (e.g., from a photo gallery of the electronic device 100, a photo gallery of another device, a photograph from photo sharing and/or storage service, etc.) into a stick figure (e.g., a posture stick figure) depicting the selected posture, and store the stick figure as part of a set of stored user postures.

The photograph associated with the selected posture 902 (e.g., the photograph depicting the selected posture 902, the photograph used to create the stick figure depicting the selected posture 902, the photograph used to create a representation of the selected posture 902, etc.) can be a scene-based photograph and/or a subject-based photograph. For example, the photograph associated with the selected posture 902 can be selected based on a scene of the photograph (e.g., because the scene of the photograph is similar or the same as the scene of the photograph being taken, because of a scene preference, because of one or more characteristics of the scene of the photograph and/or the subject(s) being photographed such as a mood of the subject(s) or a pattern in the scene, etc.), the subject in the photograph associated with the selected posture 902, and/or the subject 910.

In some examples, when determining a match between the particular posture of the subject 910 and the selected posture 902, the electronic device 100 can determine an overlap and/or alignment between an outline of the particular posture of the subject 910 and an outline 908 of the selected posture 902. In some cases, the preview image 904 can depict the subject 910 in the particular posture as well as the outline 908 of the selected posture 902. For example, the preview image 904 can depict the subject 910 in the particular posture depict an overlay and/or alignment between the particular posture of the subject 910 and the outline 908 of the selected posture 902.

After determining the match between the particular posture of the subject 910 and the selected posture 902, the electronic device 100 can provide feedback to the subject 910 recommending any adjustments to the particular posture of the subject 910 that will result in a better match between the posture of the subject 910 and the selected posture 902. For example, in some cases, the electronic device 100 can provide feedback to the subject 910 recommending any adjustments to the particular posture of the subject 910 in the preview image 904 that result in a higher matching score between the posture of the subject 910 and the selected posture 902. In some cases, the electronic device 100 can provide feedback to the subject 910 recommending any adjustments to the particular posture of the subject 910 in the preview image 904 that will bring the posture of the subject 910 within (or substantially within) the outline 908 of the selected posture 902. In some cases, the electronic device 100 can automatically capture an image of the subject 910 when a matching amount between the particular posture of the subject 910 and the selected posture 902 exceeds a threshold. For example, the electronic device 100 can determine whether the matching amount between the particular posture of the subject 910 and the selected posture 902 exceeds a threshold. Based on the determination that the matching amount excepts the threshold, the electronic device 100 can trigger a camera of the electronic device 100 to automatically capture an image of the subject.

The feedback to the subject 910 can include one or more text instructions with suggested adjustments to the particular posture of the subject 910, one or more arrows depicting suggested adjustments to the particular posture (e.g., one or more arrows identifying one or more portions of the particular posture and a direction for moving and/or adjusting those one or more portions), an animation depicting suggested adjustments to the particular posture of the subject 910, etc.

In some cases, the electronic device 100 can provide the feedback within the preview image 904. For example, in FIG. 9, the preview image 904 has been modified by the electronic device 100 to generate a new preview image 912 depicting the feedback for the subject 910. In this example, the feedback depicted in the preview image 912 includes arrows 914 and 918 indicating which parts of the subject 910 should be moved to better match the selected posture 902 and a direction in which to move those parts of the subject 910. In particular, the arrow 914 projects from the head of the subject 910 to indicate that the head of the subject 910 should be moved and depicts a direction in which to move the head of the subject 910. Arrow 918 projects from the left hand of the subject 910 to indicate that the left hand of the subject 910 should be moved and depicts a direction in which to move the left hand of the subject 910.

The feedback depicted in the preview image 912 additionally includes text instructions 916 and 920 describing the suggested adjustments to the subject 910. For example, the text instructions 916 indicate that the subject 910 should move the head to the left, and the text instructions 920 indicate that the subject 910 should move the left leg to the left. In some cases, the text instructions 916 can provide an estimated amount a particular body part should be moved.

For example, the text instructions 916 can indicate that the head should be rotated by an approximated amount or to an approximated position or angle relative to the body of the subject 910. As another example, the text instructions 920 can indicate that the subject 910 should move the left leg a number of inches (or any other units) to the left. As yet another example, the text instructions 920 can indicate that the subject 910 should rotate the left foot by a certain amount or angle relative to the body of the subject 910 and/or should point in a certain direction relative to the body of the subject 910.

Figure 10:
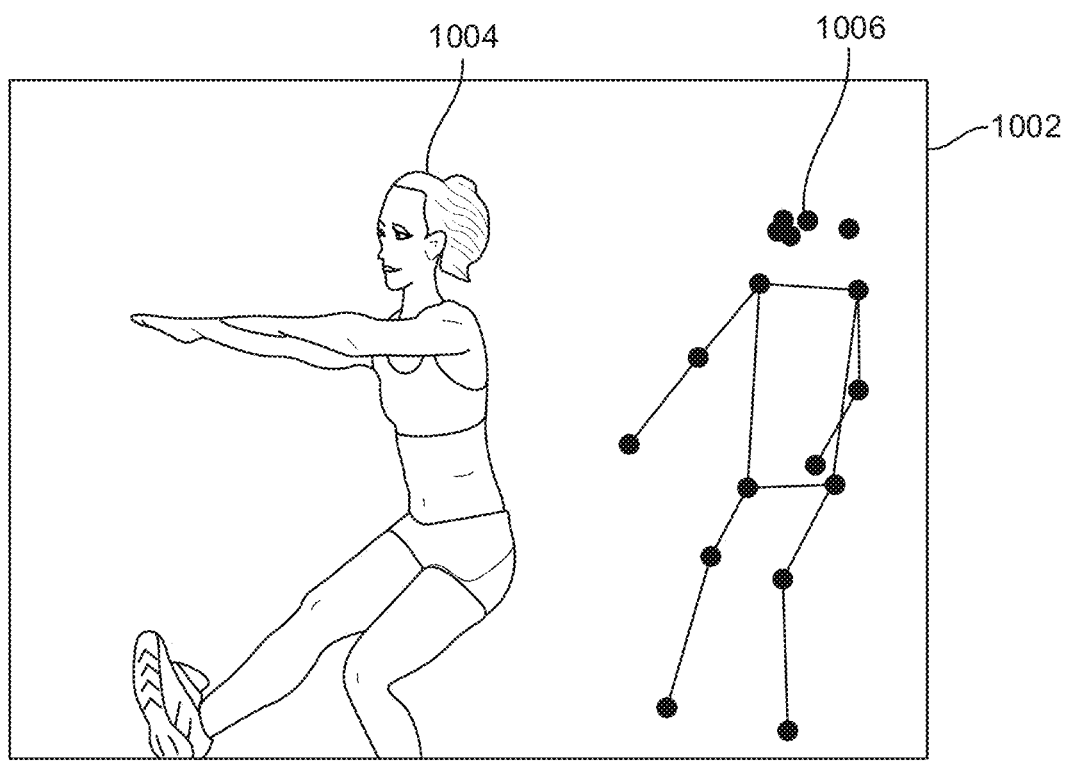
FIG. 10 is a diagram illustrating an example of a posture mode implementation to validate or adjust user movements associated with an activity, in accordance with some examples of the present disclosure.

FIG. 10 is a diagram illustrating an example of a posture mode implementation to validate or adjust user movements associated with an activity. In this example, the activity includes an exercise. However, in other examples, the activity can include any other activity such as, for example, a sporting activity, a physical therapy activity, and/or any other activity.

As shown, the electronic device 100 can capture an image 1002 of a subject 1004 performing the activity. The image 1002 can include a still image of the subject 1004 in a particular posture associated with the activity, or a video frame from a sequence of video frames depicting the subject 1004 performing the activity. The electronic device 100 can use the image 1002 to recommend adjustments to a posture of the subject 1004 for performing the activity or recommend posture and/or movement changes to improve a technique of the subject 1004 in performing the activity.

The electronic device 100 can compare the posture (and/or a set of postures and/or movements associated with the activity) of the subject 1004 in the image 1002 with a posture 1006 from a set of stored user postures associated with the activity. Based on the comparison, the electronic device 100 can determine a match between the posture of the subject 1004 in the image 1002 and the posture 1006 from the set of user postures. For example, the electronic device 100 can determine an overlap and/or alignment between the posture of the subject 1004 in the image 1002 and the posture 1006. The electronic device 100 can additionally or alternatively determine any misalignment between the posture of the subject 1004 in the image 1002 and the posture 1006 and/or any non-overlapping portions of the posture of the subject 1004 in the image 1002 and the posture 1006. The electronic device 100 can determine any recommended adjustments to the posture of the subject 1004 in the image 1002 to better match (e.g., better align and/or overlap) the posture of the subject 1004 with the posture 1006.

In some examples, the electronic device 100 can determine any recommended adjustments to the posture of the subject 1004 in the image 1002 based on the match between the posture of the subject 1004 in the image 1002 and the posture 1006. For example, the electronic device 100 can determine any recommended adjustments to the posture of the subject 1004 in the image 1002 based on any overlap between the posture of the subject 1004 in the image 1002 and the posture 1006, any alignment between the posture of the subject 1004 in the image 1002 and the posture 1006, any misalignment between the posture of the subject 1004 in the image 1002 and the posture 1006, and/or any non-overlapping portions of the posture of the subject 1004 in the image 1002 and the posture 1006.

In some examples, the recommended adjustments can include text instructions for adjusting the posture of the subject 1004 to better match the posture 1006. In some cases, the recommended adjustments can include an animation depicting the recommended adjustments, one or more arrows and/or other indicia providing information regarding the recommended adjustments, a preview of the recommended adjustments, etc.

In some cases, the electronic device 100 can display the recommended adjustments on a display device of the electronic device 100. In some cases, the electronic device 100 can additionally or alternatively send the recommended adjustments to one or more devices associated with one or more users, such as the subject 1004, a coach or trainer, a parent, a health care professional, etc.

Figure 11:
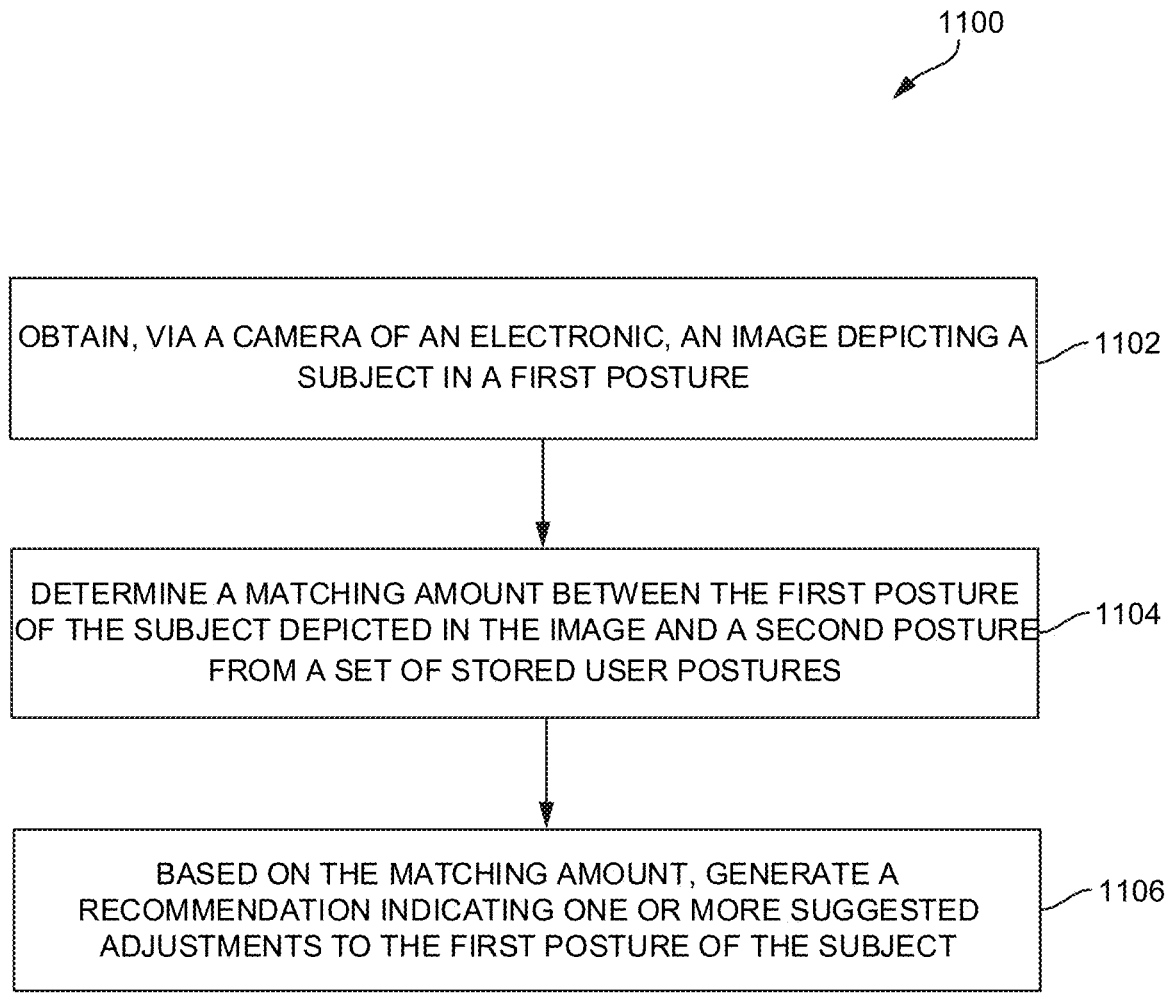
FIG. 11 is a flowchart illustrating an example process for adjusting camera settings based on event data, in accordance with some examples of the present disclosure.

FIG. 11 is a flowchart illustrating an example process 1100 for adjusting a posture of a subject(s) being photographed. At block 1102, the process 1100 can include obtaining, via a camera (e.g., camera 102, camera 104) of an electronic device (e.g., electronic device 100), an image depicting a subject in a first posture.

At block 1104, the process 1100 can include determining a matching amount between the first posture of the subject depicted in the image and a second posture from a set of stored user postures.

In some examples, determining the matching amount between the first posture of the subject and the second posture from the set of stored user postures can include comparing the first posture of the subject with the second posture from the set of stored user postures. In some cases, determining the matching amount can include determining, based on the comparing of first posture with the second posture, a matching score for the second posture. In some examples, the matching amount can indicate an amount of alignment between a first outline of the first posture of the subject and a second outline of the second posture, an amount of overlap between the first outline of the first posture of the subject and the second outline of the second posture, an amount of similarity between the first outline of the first posture of the subject and the second outline of the second posture, and/or a percent match between the first outline of the first posture of the subject and the second outline of the second posture.

At block 1106, the process 1100 can include generating, based on the matching amount, a recommendation indicating one or more suggested adjustments to the first posture of the subject. In some examples, the one or more suggested adjustments can include one or more adjustments estimated to increase the matching amount between the first posture of the subject and the second posture from the set of stored user postures.

In some aspects, the process 1100 can include determining a respective matching amount between the first posture of the subject and each posture from the set of stored user postures, selecting the second posture from the set of stored user postures based on the respective matching amount between the first posture of the subject and each posture from the set of stored user postures, and in response to selecting the second posture, generating the recommendation indicating the one or more suggested adjustments to the first posture of the subject. In some examples, the second posture can be the highest matching posture from the set of stored user postures.

In some aspects, the process 1100 can include comparing the first posture of the subject with each posture from the set of stored user postures, determining a respective matching amount between the first posture of the subject and each posture from the set of stored user postures, and determining, based on the respective matching amount between the first posture of the subject and each posture from the set of stored user postures, a number of highest matching postures (e.g., the top n number of highest matching postures) from the set of stored user postures. In some examples, the number of highest matching postures can include the second posture.

In some aspects, the process 1100 can include generating an indication of the number of highest matching postures, receiving a user input selecting the second posture from the number of highest matching postures, and selecting the second posture based on the user input. In some aspects, the process 1100 can include presenting, at a display of the electronic device, the indication of the number of highest matching postures or sending, to one or more devices associated with the subject, the indication of the number of highest matching postures. In some cases, the indication of the number of highest matching postures can include a preview of the number of highest matching postures. In some aspects, the process 1100 can include generating, in response to selecting the second posture based on the user input, the recommendation indicating the one or more suggested adjustments to the first posture of the subject.

In some examples, generating the recommendation indicating the one or more suggested adjustments to the first posture of the subject can include determining, based on a comparison between the first posture of the subject and the second posture from the set of stored user postures, one or more differences between the first posture of the subject and the second posture from the set of stored user postures, and determining the one or more suggested adjustments based on the one or more differences between the first posture of the subject and the second posture from the set of stored user postures.

In some aspects, the process 1100 can include obtaining, via the camera of the electronic device, a second image depicting the subject in a third posture, detecting the third posture of the subject in the second image, and determining that the third posture of the subject at least partially includes the one or more suggested adjustments. In some aspects, the process 1100 can include storing, in response to determining that the third posture of the subject includes the one or more suggested adjustments, the second image depicting the subject in the third posture. In some aspects, the process 1100 can include sending, in response to determining that the third posture of the subject includes the one or more suggested adjustments, the second image depicting the subject in the third posture to one or more devices associated with the subject.

In some aspects, the process 1100 can include determining, based on a comparison between the third posture of the subject and the second posture from the set of stored user postures, one or more differences between the third posture of the subject and the second posture from the set of stored user postures, determining one or more additional adjustments based on the one or more differences between the third posture of the subject and the second posture from the set of stored user postures, and modifying, using a machine learning model, the second image based on the one or more additional adjustments.

In some examples, modifying the second image based on the one or more additional adjustments can include performing a geometric transformation of at least a portion of the third posture in the second image associated with the one or more additional adjustments and/or a transformation of a set of pixel coordinates in the second image. The set of pixel coordinates can correspond to pixels depicting at least the portion of the third posture in the second image associated with the one or more additional adjustments.

In some aspects, the process 1100 can include determining that the subject is facing a display of the electronic device; and presenting, at the display of the electronic device, the recommendation indicating one or more suggested adjustments to the first posture of the subject. In some examples, the recommendation can be presented at the display while the subject is facing the display. In some cases, the electronic device can perform facial detection and/or eye gaze tracking to determine that the subject is facing the display. The electronic device can then present the recommendation at the display while the subject is facing the display. In some examples, the display can be a front display of the electronic device, and the recommendation can be presented on the front display when the subject is trying to capture a selfie or the camera is in a selfie or portrait mode.

In some aspects, the process 1100 can include presenting, at a first portion of a foldable display of the electronic device, the recommendation indicating one or more suggested adjustments to the first posture of the subject. In some examples, the first portion of the foldable display can include a display portion that is at least partly folded relative to a second portion of the foldable display. In some cases, the electronic device can present the recommendation on a folded portion of the display facing the subject.

In some aspects, the process 1100 can include generating, based on the one or more suggested adjustments to the first posture of the subject, haptic feedback including vibrations indicative of at least one suggested adjustment from the one or more suggested adjustments. In some examples, the vibrations can guide the subject in making posture adjustments according to the one or more suggested adjustments.

In some aspects, the process 1100 can include sending the one or more suggested adjustments to a device associated with the subject. In some examples, the device can include a watch, a head-mounted display, a mobile phone, and/or glasses.

In some aspects, the process 1100 can include automatically capturing an image of the subject when the matching amount exceeds a threshold. For example, the electronic device can determine whether the matching amount between the second posture and a current posture of the subject (e.g., the first posture, the first posture with one or more adjustments, etc.) exceeds a threshold. Based on the determination that the matching amount excepts the threshold, the electronic device can trigger the camera to automatically capture an image of the subject.

In some examples, the process 500, the process 700, the process 800, the process 820, and/or the process 1100 may be performed by one or more computing devices or apparatuses. In one illustrative example, the process 500, the process 700, the process 800, the process 820, and/or the process 1100 can be performed by the electronic device 100 shown in FIG. 1. In some examples, the process 500, the process 700, the process 800, the process 820, and/or the process 1100 can be performed by one or more computing devices with the computing device architecture 1200 shown in FIG. 12. In some cases, such a computing device or apparatus may include a processor, microprocessor, microcomputer, or other component of a device that is configured to carry out the steps of the process 500, the process 700, the process 800, the process 820, and/or the process 1100. In some examples, such computing device or apparatus may include one or more sensors configured to capture image data and/or other sensor measurements. For example, the computing device can include a smartphone, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 500, the process 700, the process 800, the process 820, and the process 1100 are illustrated as logical flow diagrams, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500, the process 700, the process 800, the process 820, and/or the process 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
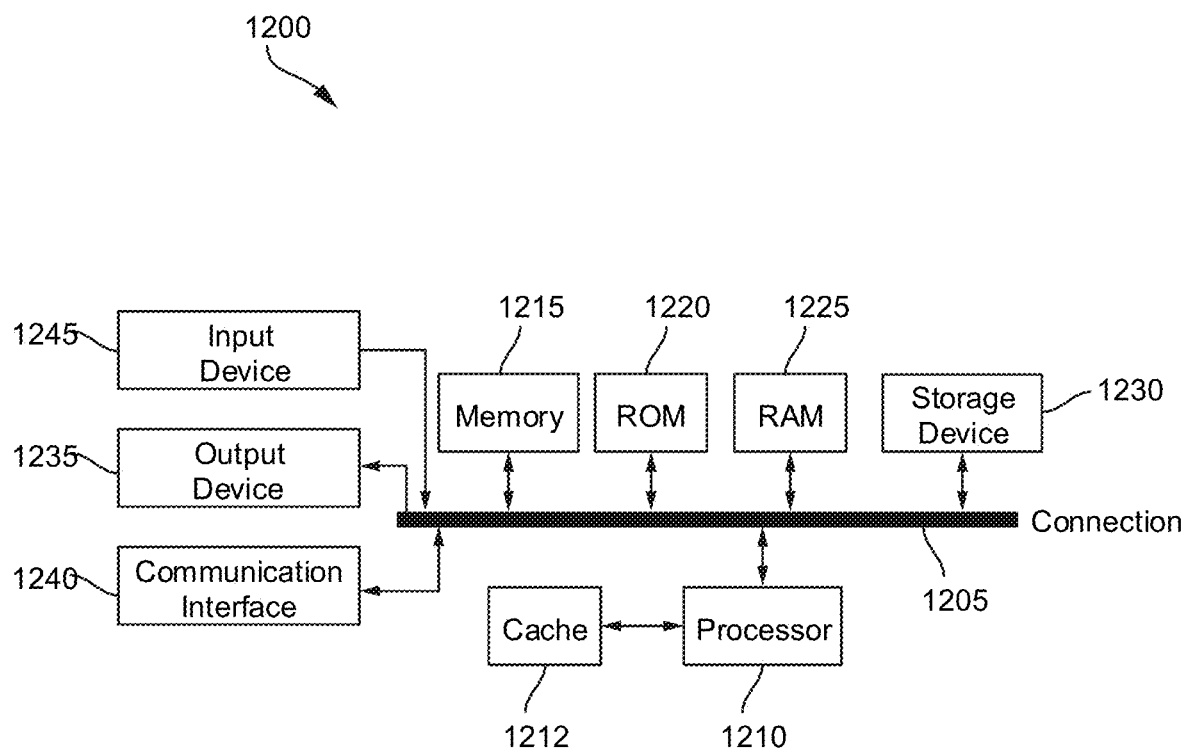
FIG. 12 illustrates an example computing device architecture, in accordance with some examples of the present disclosure.

FIG. 12 illustrates an example computing device architecture 1200 of an example computing device which can implement various techniques described herein. For example, the computing device architecture 1200 can implement at least some portions of the electronic device 100 shown in FIG. 1. The components of the computing device architecture 1200 are shown in electrical communication with each other using a connection 1205, such as a bus. The example computing device architecture 1200 includes a processing unit (CPU or processor) 1210 and a computing device connection 1205 that couples various computing device components including the computing device memory 1215, such as read only memory (ROM) 1220 and random access memory (RAM) 1225, to the processor 1210.

The computing device architecture 1200 can include a cache of high-speed memory connected directly with, in close proximity to, or integrated as part of the processor 1210. The computing device architecture 1200 can copy data from the memory 1215 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other computing device memory 1215 may be available for use as well. The memory 1215 can include multiple different types of memory with different performance characteristics. The processor 1210 can include any general-purpose processor and a hardware or software service stored in storage device 1230 and configured to control the processor 1210 as well as a special-purpose processor where software instructions are incorporated into the processor design. The processor 1210 may be a self-contained system, containing multiple cores or processors, a bus, memory controller, cache, etc. A multi-core processor may be symmetric or asymmetric.

To enable user interaction with the computing device architecture 1200, an input device 1245 can represent any number of input mechanisms, such as a microphone for speech, a touch-sensitive screen for gesture or graphical input, keyboard, mouse, motion input, speech and so forth. An output device 1235 can also be one or more of a number of output mechanisms known to those of skill in the art, such as a display, projector, television, speaker device. In some instances, multimodal computing devices can enable a user to provide multiple types of input to communicate with the computing device architecture 1200. The communication interface 1240 can generally govern and manage the user input and computing device output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof. The storage device 1230 can include software, code, firmware, etc., for controlling the processor 1210. Other hardware or software modules are contemplated. The storage device 1230 can be connected to the computing device connection 1205. In one aspect, a hardware module that performs a particular function can include the software component stored in a computer-readable medium in connection with the necessary hardware components, such as the processor 1210, connection 1205, output device 1235, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1. An apparatus for adjusting a posture of a subject in a photograph, the apparatus comprising: a memory; and one or more processors coupled to the memory, the one or more processors being configured to: obtain, via a camera of the apparatus, an image depicting a subject in a first posture; determine a matching amount between the first posture of the subject depicted in the image and a second posture from a set of stored user postures; and based on the matching amount, generate a recommendation indicating one or more suggested adjustments to the first posture of the subject, the one or more suggested adjustments being estimated to increase the matching amount between the first posture of the subject and the second posture from the set of stored user postures.

Aspect 2. The apparatus of Aspect 1, wherein, to determine the matching amount between the first posture of the subject and the second posture from the set of stored user postures, the one or more processors are configured to: compare the first posture of the subject with the second posture from the set of stored user postures.

Aspect 3. The apparatus of Aspect 2, wherein the matching amount indicates at least one of an amount of alignment between a first outline of the first posture of the subject and a second outline of the second posture, an amount of overlap between the first outline of the first posture of the subject and the second outline of the second posture, an amount of similarity between the first outline of the first posture of the subject and the second outline of the second posture, and a percent match between the first outline of the first posture of the subject and the second outline of the second posture.

Aspect 4. The apparatus of any of Aspects 1 to 3, wherein the one or more processors are configured to: determine a respective matching amount between the first posture of the subject and each posture from the set of stored user postures; select the second posture from the set of stored user postures based on the respective matching amount between the first posture of the subject and each posture from the set of stored user postures, wherein the second posture comprises a highest matching posture from the set of stored user postures; and in response to selecting the second posture, generate the recommendation indicating the one or more suggested adjustments to the first posture of the subject.

Aspect 5. The apparatus of any of Aspects 1 to 4, wherein the one or more processors are configured to: compare the first posture of the subject with each posture from the set of stored user postures; determine a respective matching amount between the first posture of the subject and each posture from the set of stored user postures; and determine, based on the respective matching amount between the first posture of the subject and each posture from the set of stored user postures, a number of highest matching postures from the set of stored user postures, wherein the number of highest matching postures comprises the second posture.

Aspect 6. The apparatus of Aspect 5, wherein the one or more processors are configured to: generate an indication of the number of highest matching postures; receive a user input selecting the second posture from the number of highest matching postures; and select the second posture based on the user input.

Aspect 7. The apparatus of Aspect 6, wherein the one or more processors are configured to present, at a display of the apparatus, the indication of the number of highest matching postures or send, to one or more devices associated with the subject, the indication of the number of highest matching postures.

Aspect 8. The apparatus of any of Aspects 6 to 7, wherein the indication of the number of highest matching postures comprises a preview of the number of highest matching postures.

Aspect 9. The apparatus of any of Aspects 6 to 8, wherein the one or more processors are configured to: in response to selecting the second posture based on the user input, generate the recommendation indicating the one or more suggested adjustments to the first posture of the subject.

Aspect 10. The apparatus of any of Aspects 1 to 9, wherein the one or more processors are configured to: update the set of stored user postures to include a particular posture of the subject depicted in one or more images of the subject.

Aspect 11. The apparatus of any of Aspects 1 to 10, wherein the one or more processors are configured to: determine that the subject is facing a display of the apparatus; and present, at the display of the apparatus, the recommendation indicating one or more suggested adjustments to the first posture of the subject, the recommendation being presented at the display while the subject is facing the display.

Aspect 12. The apparatus of any of Aspects 1 to 11, wherein the one or more processors are configured to: present, at a first portion of a foldable display of the apparatus, the recommendation indicating one or more suggested adjustments to the first posture of the subject, the first portion of the foldable display comprising a display portion that is at least partly folded relative to a second portion of the foldable display.

Aspect 13. The apparatus of any of Aspects 1 to 12, wherein the one or more processors are configured to: generate, based on the one or more suggested adjustments to the first posture of the subject, haptic feedback comprising vibrations indicative of at least one suggested adjustment from the one or more suggested adjustments.

Aspect 14. The apparatus of any of Aspects 1 to 13, wherein the one or more processors are configured to: send the one or more suggested adjustments to a device associated with the subject, the device comprising at least one of a watch, a head-mounted display, a mobile phone, and glasses.

Aspect 15. The apparatus of any of Aspects 1 to 14, wherein, to generate the recommendation indicating the one or more suggested adjustments to the first posture of the subject, the one or more processors are configured to: determine, based on a comparison between the first posture of the subject and the second posture from the set of stored user postures, one or more differences between the first posture of the subject and the second posture from the set of stored user postures; and determine the one or more suggested adjustments based on the one or more differences between the first posture of the subject and the second posture from the set of stored user postures.

Aspect 16. The apparatus of any of Aspects 1 to 15, wherein the one or more processors are configured to: obtain, via the camera of the apparatus, a second image depicting the subject in a third posture; detect the third posture of the subject in the second image; and determine that the third posture of the subject at least partially includes the one or more suggested adjustments.

Aspect 17. The apparatus of Aspect 16, wherein the one or more processors are configured to: in response to determining that the third posture of the subject includes the one or more suggested adjustments, store the second image depicting the subject in the third posture.

Aspect 18. The apparatus of any of Aspects 16 to 17, wherein the one or more processors are configured to: in response to determining that the third posture of the subject includes the one or more suggested adjustments, send the second image depicting the subject in the third posture to one or more devices associated with the subject.

Aspect 19. The apparatus of any of Aspects 16 to 18, wherein the one or more processors are configured to: determine, based on a comparison between the third posture of the subject and the second posture from the set of stored user postures, one or more differences between the third posture of the subject and the second posture from the set of stored user postures; determine one or more additional adjustments based on the one or more differences between the third posture of the subject and the second posture from the set of stored user postures; and modify, using a machine learning model, the second image based on the one or more additional adjustments.

Aspect 20. The apparatus of Aspect 19, wherein, to modify the second image based on the one or more additional adjustments, the one or more processors are configured to: perform at least one of a geometric transformation of at least a portion of the third posture in the second image associated with the one or more additional adjustments and a transformation of a set of pixel coordinates in the second image, the set of pixel coordinates corresponding to pixels depicting at least the portion of the third posture in the second image associated with the one or more additional adjustments.

Aspect 21. The apparatus of any of Aspects 1 to 20, further comprising the camera.

Aspect 22. The apparatus of any of Aspects 1 to 21, wherein the apparatus comprises a mobile device.

Aspect 23. A method for adjusting a posture of a subject in a photograph, the method comprising: obtaining, via a camera of an electronic device, an image depicting a subject in a first posture; determining a matching amount between the first posture of the subject depicted in the image and a second posture from a set of stored user postures; and based on the matching amount, generating a recommendation indicating one or more suggested adjustments to the first posture of the subject, the one or more suggested adjustments being estimated to increase the matching amount between the first posture of the subject and the second posture from the set of stored user postures.

Aspect 24. The method of Aspect 23, wherein determining the matching amount between the first posture of the subject and the second posture from the set of stored user postures comprises: comparing the first posture of the subject with the second posture from the set of stored user postures.

Aspect 25. The apparatus of Aspect 24, wherein the matching amount indicates at least one of an amount of alignment between a first outline of the first posture of the subject and a second outline of the second posture, an amount of overlap between the first outline of the first posture of the subject and the second outline of the second posture, an amount of similarity between the first outline of the first posture of the subject and the second outline of the second posture, and a percent match between the first outline of the first posture of the subject and the second outline of the second posture.

Aspect 26. The method of any of Aspects 23 to 25, further comprising: determining a respective matching amount between the first posture of the subject and each posture from the set of stored user postures; selecting the second posture from the set of stored user postures based on the respective matching amount between the first posture of the subject and each posture from the set of stored user postures, wherein the second posture comprises a highest matching posture from the set of stored user postures; and in response to selecting the second posture, generating the recommendation indicating the one or more suggested adjustments to the first posture of the subject.

Aspect 27. The method of any of Aspects 23 to 26, further comprising: comparing the first posture of the subject with each posture from the set of stored user postures; determining a respective matching amount between the first posture of the subject and each posture from the set of stored user postures; and determining, based on the respective matching amount between the first posture of the subject and each posture from the set of stored user postures, a number of highest matching postures from the set of stored user postures, wherein the number of highest matching postures comprises the second posture.

Aspect 28. The method of Aspect 27, further comprising: generating an indication of the number of highest matching postures; receiving a user input selecting the second posture from the number of highest matching postures; and selecting the second posture based on the user input.

Aspect 29. The apparatus of Aspect 28, further comprising presenting, at a display of the electronic device, the indication of the number of highest matching postures or send, to one or more devices associated with the subject, the indication of the number of highest matching postures.

Aspect 30. The apparatus of any of Aspects 27 to 29, wherein the indication of the number of highest matching postures comprises a preview of the number of highest matching postures.

Aspect 31. The apparatus of any of Aspects 27 to 30, further comprising: in response to selecting the second posture based on the user input, generating the recommendation indicating the one or more suggested adjustments to the first posture of the subject.

Aspect 32. The method of any of Aspects 23 to 31, further comprising: updating the set of stored user postures to include a particular posture of the subject depicted in one or more images of the subject.

Aspect 33. The method of any of Aspects 23 to 32, further comprising: determining that the subject is facing a display of the apparatus; and presenting, at the display of the electronic device, the recommendation indicating one or more suggested adjustments to the first posture of the subject, the recommendation being presented at the display while the subject is facing the display.

Aspect 34. The method of any of Aspects 23 to 33, further comprising: presenting, at a first portion of a foldable display of the electronic device, the recommendation indicating one or more suggested adjustments to the first posture of the subject, the first portion of the foldable display comprising a display portion that is at least partly folded relative to a second portion of the foldable display.

Aspect 35. The method of any of Aspects 23 to 34, further comprising: generating, based on the one or more suggested adjustments to the first posture of the subject, haptic feedback comprising vibrations indicative of at least one suggested adjustment from the one or more suggested adjustments.

Aspect 36. The method of any of Aspects 23 to 35, further comprising: sending the one or more suggested adjustments to a device associated with the subject, the device comprising at least one of a watch, a head-mounted display, a mobile phone, and glasses.

Aspect 37. The method of any of Aspects 23 to 36, wherein generating the recommendation indicating the one or more suggested adjustments to the first posture of the subject comprises: determining, based on a comparison between the first posture of the subject and the second posture from the set of stored user postures, one or more differences between the first posture of the subject and the second posture from the set of stored user postures; and determining the one or more suggested adjustments based on the one or more differences between the first posture of the subject and the second posture from the set of stored user postures.

Aspect 38. The method of any of Aspects 23 to 37, further comprising: obtaining, via the camera of the electronic device, a second image depicting the subject in a third posture; detecting the third posture of the subject in the second image; and determining that the third posture of the subject at least partially includes the one or more suggested adjustments.

Aspect 39. The method of Aspect 38, further comprising: in response to determining that the third posture of the subject includes the one or more suggested adjustments, storing the second image depicting the subject in the third posture.

Aspect 40. The method of any of Aspects 38 to 39, further comprising: in response to determining that the third posture of the subject includes the one or more suggested adjustments, sending the second image depicting the subject in the third posture to one or more devices associated with the subject.

Aspect 41. The method of any of Aspects 38 to 40, further comprising: determining, based on a comparison between the third posture of the subject and the second posture from the set of stored user postures, one or more differences between the third posture of the subject and the second posture from the set of stored user postures; determining one or more additional adjustments based on the one or more differences between the third posture of the subject and the second posture from the set of stored user postures; and modifying, using a machine learning model, the second image based on the one or more additional adjustments.

Aspect 42. The method of Aspect 41, wherein modifying the second image based on the one or more additional adjustments comprises: performing at least one of a geometric transformation of at least a portion of the third posture in the second image associated with the one or more additional adjustments and a transformation of a set of pixel coordinates in the second image, the set of pixel coordinates corresponding to pixels depicting at least the portion of the third posture in the second image associated with the one or more additional adjustments.

Aspect 43. An apparatus comprising means for performing a method according to any of Aspects 23 to 42.

Aspect 44. A non-transitory computer-readable medium having stored thereon instructions which, when executed by one or more processors, cause the one or more processors to perform a method according to any of Aspects 23 to 42.

What is claimed is:

1. An apparatus for adjusting a posture of a subject in a photograph, the apparatus comprising:
   a memory; and
   one or more processors coupled to the memory, the one or more processors being configured to:
      obtain, via a camera, an image depicting a subject in a first posture;
      compare the first posture of the subject with a set of stored user postures, the set of stored user postures comprising a second posture;
      determine, based on the comparison of the first posture with the set of stored user postures, at least one matching amount between the first posture of the subject depicted in the image and the set of stored user postures;
      determine, based on the at least one matching amount between the first posture of the subject and the set of stored user postures, a number of highest matching postures from the set of stored user postures, wherein the number of highest matching postures comprises the second posture; and
      based on the number of highest matching postures, generate a recommendation indicating one or more suggested adjustments to the first posture of the subject, the one or more suggested adjustments being estimated to increase a matching amount between the first posture of the subject and the second posture from the set of stored user postures.

2. The apparatus of claim 1, wherein, to determine the matching amount between the first posture of the subject and the second posture from the set of stored user postures, the one or more processors are configured to:
   compare the first posture of the subject with the second posture from the set of stored user postures.

3. The apparatus of claim 2, wherein the matching amount between the first posture and the second posture indicates at least one of an amount of alignment between a first outline of the first posture of the subject and a second outline of the second posture, an amount of overlap between the first outline of the first posture of the subject and the second outline of the second posture, an amount of similarity between the first outline of the first posture of the subject and the second outline of the second posture, and a percent match between the first outline of the first posture of the subject and the second outline of the second posture.

4. The apparatus of claim 1, wherein the one or more processors are configured to:
   generate an indication of the number of highest matching postures;
   receive a user input selecting the second posture from the number of highest matching postures; and
   select the second posture based on the user input.

5. The apparatus of claim 4, wherein the one or more processors are configured to at least one of present, at a display of the apparatus, the indication of the number of highest matching postures or send, to one or more devices associated with the subject, the indication of the number of highest matching postures.

6. The apparatus of claim 4, wherein the indication of the number of highest matching postures comprises a preview of the number of highest matching postures.

7. The apparatus of claim 4, wherein the one or more processors are configured to:
   in response to selecting the second posture based on the user input, generate the recommendation indicating the one or more suggested adjustments to the first posture of the subject.

8. The apparatus of claim 1, wherein the one or more processors are configured to:
   update the set of stored user postures to include a particular posture of the subject depicted in one or more images of the subject.

9. The apparatus of claim 1, wherein the one or more processors are configured to:
   determine that the subject is facing a display of the apparatus; and
   present, at the display of the apparatus, the recommendation indicating one or more suggested adjustments to the first posture of the subject, the recommendation being presented at the display while the subject is facing the display.

10. The apparatus of claim 1, wherein the one or more processors are configured to:
    present, at a first portion of a foldable display of the apparatus, the recommendation indicating one or more suggested adjustments to the first posture of the subject, the first portion of the foldable display comprising a display portion that is at least partly folded relative to a second portion of the foldable display.

11. The apparatus of claim 1, wherein the one or more processors are configured to:
    generate, based on the one or more suggested adjustments to the first posture of the subject, haptic feedback comprising vibrations indicative of at least one suggested adjustment from the one or more suggested adjustments.

12. The apparatus of claim 1, wherein the one or more processors are configured to:
    send the one or more suggested adjustments to a device associated with the subject, the device comprising at least one of a watch, a head-mounted display, a mobile phone, and glasses.

13. The apparatus of claim 1, wherein, to generate the recommendation indicating the one or more suggested adjustments to the first posture of the subject, the one or more processors are configured to:
    determine, based on a comparison between the first posture of the subject and the second posture from the set of stored user postures, one or more differences between the first posture of the subject and the second posture from the set of stored user postures; and determine the one or more suggested adjustments based on the one or more differences between the first posture of the subject and the second posture from the set of stored user postures.

14. The apparatus of claim 1, wherein the one or more processors are configured to:
obtain, via the camera of the apparatus, a second image depicting the subject in a third posture;
detect the third posture of the subject in the second image; and
determine that the third posture of the subject at least partially includes the one or more suggested adjustments.

15. The apparatus of claim 14, wherein the one or more processors are configured to:
in response to determining that the third posture of the subject includes the one or more suggested adjustments, store the second image depicting the subject in the third posture.

16. The apparatus of claim 14, wherein the one or more processors are configured to:
in response to determining that the third posture of the subject includes the one or more suggested adjustments, send the second image depicting the subject in the third posture to one or more devices associated with the subject.

17. The apparatus of claim 14, wherein the one or more processors are configured to:
determine, based on a comparison between the third posture of the subject and the second posture from the set of stored user postures, one or more differences between the third posture of the subject and the second posture from the set of stored user postures;
determine one or more additional adjustments based on the one or more differences between the third posture of the subject and the second posture from the set of stored user postures; and
modify, using a machine learning model, the second image based on the one or more additional adjustments.

18. The apparatus of claim 17, wherein, to modify the second image based on the one or more additional adjustments, the one or more processors are configured to:
perform at least one of a geometric transformation of at least a portion of the third posture in the second image associated with the one or more additional adjustments and a transformation of a set of pixel coordinates in the second image, the set of pixel coordinates corresponding to pixels depicting at least the portion of the third posture in the second image associated with the one or more additional adjustments.

19. The apparatus of claim 1, further comprising the camera.

20. The apparatus of claim 1, wherein the apparatus comprises a mobile device.

21. A method for adjusting a posture of a subject in a photograph, the method comprising:
obtaining, via a camera of an electronic device, an image depicting a subject in a first posture;
comparing the first posture of the subject with a set of stored user postures, the set of stored user postures comprising a second posture;
determining, based on comparing the first posture with the set of stored user postures, at least one matching amount between the first posture of the subject depicted in the image and the set of stored user postures;
determine, based on the at least one matching amount between the first posture of the subject and the set of stored user postures, a number of highest matching postures from the set of stored user postures, wherein the number of highest matching postures comprises the second posture; and
based on the number of highest matching postures, generating a recommendation indicating one or more suggested adjustments to the first posture of the subject, the one or more suggested adjustments being estimated to increase a matching amount between the first posture of the subject and the second posture from the set of stored user postures.

22. The method of claim 21, further comprising:
generating an indication of the number of highest matching postures;
receiving a user input selecting the second posture from the number of highest matching postures; and
selecting the second posture based on the user input.

23. The method of claim 22, further comprising at least one of presenting, at a display of the electronic device, the indication of the number of highest matching postures or sending, to one or more devices associated with the subject, the indication of the number of highest matching postures.

24. The method of claim 22, wherein the indication of the number of highest matching postures comprises a preview of the number of highest matching postures.

25. The method of claim 22, further comprising:
in response to selecting the second posture based on the user input, generating the recommendation indicating the one or more suggested adjustments to the first posture of the subject.

26. The method of claim 22, wherein generating the recommendation indicating the one or more suggested adjustments to the first posture of the subject comprises:
determining, based on a comparison between the first posture of the subject and the second posture from the set of stored user postures, one or more differences between the first posture of the subject and the second posture from the set of stored user postures; and
determining the one or more suggested adjustments based on the one or more differences between the first posture of the subject and the second posture from the set of stored user postures.

27. The method of claim 21, further comprising:
obtaining, via the camera of the electronic device, a second image depicting the subject in a third posture;
detecting the third posture of the subject in the second image; and
determining that the third posture of the subject at least partially includes the one or more suggested adjustments.

28. The method of claim 27, further comprising:
determining, based on a comparison between the third posture of the subject and the second posture from the set of stored user postures, one or more differences between the third posture of the subject and the second posture from the set of stored user postures;
determining one or more additional adjustments based on the one or more differences between the third posture of the subject and the second posture from the set of stored user postures; and
modifying, using a machine learning model, the second image based on the one or more additional adjustments.

29. The method of claim 28, wherein modifying the second image based on the one or more additional adjustments comprises:
performing at least one of a geometric transformation of at least a portion of the third posture in the second image associated with the one or more additional adjustments and a transformation of a set of pixel coordinates in the second image, the set of pixel coordinates corresponding to pixels depicting at least the portion of the third posture in the second image associated with the one or more additional adjustments.

30. The method of claim 21, wherein the matching amount between the first posture and the second posture indicates at least one of an amount of alignment between a first outline of the first posture of the subject and a second outline of the second posture, an amount of overlap between the first outline of the first posture of the subject and the second outline of the second posture, an amount of similarity between the first outline of the first posture of the subject and the second outline of the second posture, and a percent match between the first outline of the first posture of the subject and the second outline of the second posture.

31. The method of claim 27, further comprising:
in response to determining that the third posture of the subject includes the one or more suggested adjustments, sending the second image depicting the subject in the third posture to one or more devices associated with the subject.

32. The method of claim 27, further comprising:
in response to determining that the third posture of the subject includes the one or more suggested adjustments, storing the second image depicting the subject in the third posture.

33. The method of claim 21, further comprising:
updating the set of stored user postures to include a particular posture of the subject depicted in one or more images of the subject.

34. The method of claim 21, further comprising:
determining that the subject is facing a display of the electronic device; and
presenting, at the display of the electronic device, the recommendation indicating one or more suggested adjustments to the first posture of the subject, the recommendation being presented at the display while the subject is facing the display.

35. The method of claim 21, further comprising:
presenting, at a first portion of a foldable display of the electronic device, the recommendation indicating one or more suggested adjustments to the first posture of the subject, the first portion of the foldable display comprising a display portion that is at least partly folded relative to a second portion of the foldable display.

36. The method of claim 21, further comprising: generating, based on the one or more suggested adjustments to the first posture of the subject, haptic feedback comprising vibrations indicative of at least one suggested adjustment from the one or more suggested adjustments.

* * * * *